US012728591B2

(12) United States Patent
Zhao et al.

(10) Patent No.: US 12,728,591 B2
(45) **Date of Patent: *Sep. 8, 2026**

(54) FORMING THREE-DIMENSIONAL (3D) ELECTRONIC PARTS

(71) Applicant: Peridot Print LLC, Palo Alto, CA (US)

(72) Inventors: Yan Zhao, Palo Alto, CA (US); Kristopher J. Erickson, Palo Alto, CA (US); Aja Hartman, Palo Alto, CA (US); Lihua Zhao, Palo Alto, CA (US); Sterling Chaffins, Corvallis, OR (US); Kevin P. Dekam, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,526

(22) Filed: Jul. 31, 2023

(65) Prior Publication Data

US 2023/0373157 A1 Nov. 23, 2023

Related U.S. Application Data

(60) Continuation of application No. 17/561,425, filed on Dec. 23, 2021, now Pat. No. 11,760,010, which is a (Continued)

(51) Int. Cl.
*B29C 64/165* (2017.01)
*B29C 64/112* (2017.01)
(Continued)

(52) U.S. Cl.
CPC .......... *B29C 64/165* (2017.08); *B29C 64/393* (2017.08); *B33Y 10/00* (2014.12); (Continued)

(58) Field of Classification Search
CPC ..... B29C 64/112; B29C 64/165; B33Y 10/00; B33Y 70/00; B33Y 70/10
See application file for complete search history.

(56) References Cited

U.S. PATENT DOCUMENTS 6,505,089 B1 1/2003 Yang et al.
6,890,050 B2 5/2005 Ready et al.
(Continued)

FOREIGN PATENT DOCUMENTS

EP 3442782 A1 2/2019
EP 3443043 A1 2/2019
(Continued)

OTHER PUBLICATIONS

Banerjee, P. M. et al. "3D Opportunity for Technology, Media, and Telecommunications", Dec. 7, 2015, pp. 43.
(Continued)

*Primary Examiner* — Jerzi H Moreno Hernandez
(74) *Attorney, Agent, or Firm* — Michael Dryja

(57) ABSTRACT

Methods for forming three-dimensional (3D) printed electronic parts are provided. A build material is applied. An electronic agent is selectively applied in a plurality of passes on a portion of the build material. A fusing agent is also selectively applied on the portion of the build material. The build material is exposed to radiation in a plurality of heating events. During at least one of the plurality of heating events, the portion of the build material in contact with the fusing agent fuses to form a region of a layer. The region of the layer exhibits an electronic property. An order of the plurality of passes, the selective application of the fusing agent, and the plurality of heating events is controlled to control a mechanical property of the layer and the electronic property of the region.

14 Claims, 9 Drawing Sheets

Related U.S. Application Data division of application No. 16/098,082, filed as application No. PCT/US2016/044214 on Jul. 27, 2016, now abandoned.

(51) Int. Cl.

| | |
|---|---|
| ***B29C 64/393*** | (2017.01) |
| ***B33Y 10/00*** | (2015.01) |
| ***B33Y 50/02*** | (2015.01) |
| ***B33Y 70/10*** | (2020.01) |
| *B29K 105/00* | (2006.01) |
| *B29K 105/16* | (2006.01) |

(52) U.S. Cl.

CPC ...... *B33Y 70/10* (2020.01); *B29K 2105/0023* (2013.01); *B29K 2105/0032* (2013.01); *B29K 2105/162* (2013.01); *B29K 2995/0005* (2013.01)

(56) References Cited

U.S. PATENT DOCUMENTS

| | | | |
|---|---|---|---|
| 7,261,542 | B2 | 8/2007 | Hickerson et al. |
| 8,526,056 | B2 * | 9/2013 | Gargir ................ B41J 11/00212 358/1.9 |
| 9,290,038 | B2 | 3/2016 | Colella |
| 11,760,010 | B2 * | 9/2023 | Zhao ..................... B29C 64/165 264/496 |
| 2007/0241482 | A1 | 10/2007 | Giller et al. |
| 2009/0020920 | A1 | 1/2009 | Kumagai et al. |
| 2015/0034604 | A1 | 2/2015 | Subramanian et al. |
| 2015/0069649 | A1 | 3/2015 | Bai et al. |
| 2015/0197063 | A1 | 7/2015 | Shinar et al. |
| 2015/0224711 | A1 | 8/2015 | Kodama et al. |
| 2015/0352785 | A1 | 12/2015 | Folgar et al. |
| 2015/0366073 | A1 * | 12/2015 | Magdassi ............... B33Y 70/10 264/494 |
| 2017/0015065 | A1 | 1/2017 | Potter et al. |
| 2019/0037646 | A1 | 1/2019 | Chaffins et al. |
| 2021/0170678 | A1 | 6/2021 | Chaffins et al. |

FOREIGN PATENT DOCUMENTS

| | | | | |
|---|---|---|---|---|
| WO | 2015/108555 | A1 | 7/2015 | |
| WO | WO-2015106816 | A1 * | 7/2015 | ........... B29C 64/165 |
| WO | WO-2015108544 | A1 * | 7/2015 | ........... B29C 64/165 |
| WO | 2015/136277 | A1 | 9/2015 | |
| WO | 2016/010590 | A1 | 1/2016 | |
| WO | 2016/053312 | A1 | 4/2016 | |
| WO | 2016/060799 | A1 | 4/2016 | |
| WO | 2016/068899 | A1 | 5/2016 | |
| WO | WO-2017074397 | A1 * | 5/2017 | ........... B29C 64/165 |
| WO | 2017/180161 | A1 | 10/2017 | |
| WO | 2017/180169 | A1 | 10/2017 | |

OTHER PUBLICATIONS

Saleh, E., et al., "3D Inkjet Printing of Conductive Structures Using In-situ IR Sintering", Univ of Nottingham, Additive MFG and 3D Printing Res Group, Jul. 15, 2015, pp. 1554-1559.

Dorrington, W "3D printing: is it really something that's going to change the world, or will it always just be a novelty?" What's next for 3D printing, Jul. 2015, pp. 21.

* cited by examiner

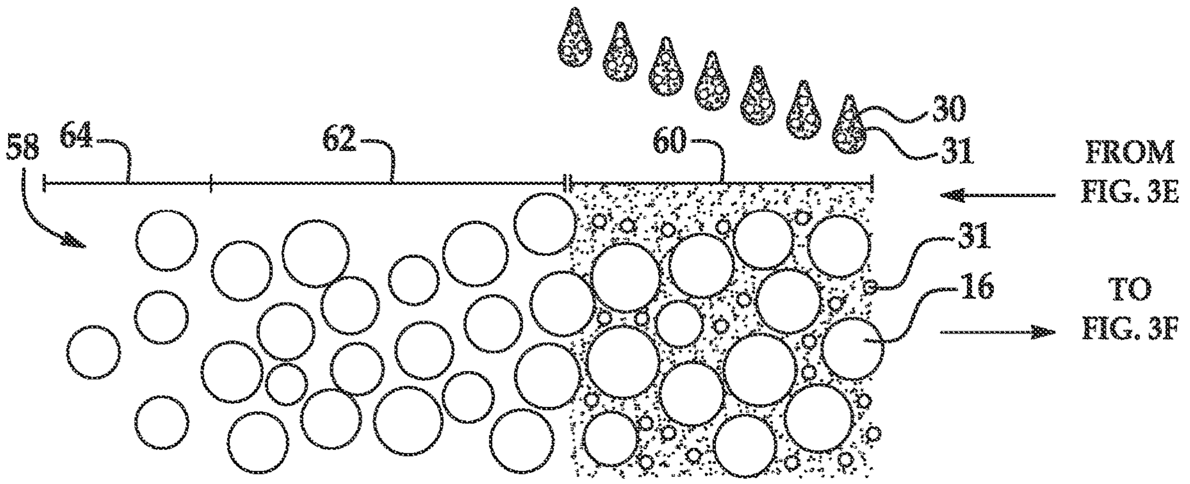
FIG. 3A
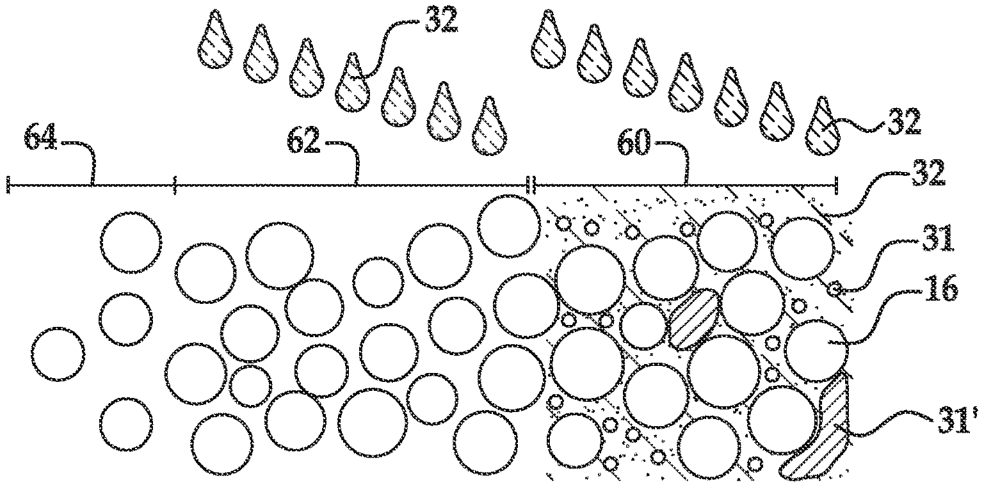
FIG. 3B
TO
FIG. 3C
30
31
58
64
62
60
FROM
31
16
TO
32
32
64
62
60
32
31
16
31'
TO

FORMING THREE-DIMENSIONAL (3D) ELECTRONIC PARTS

RELATED APPLICATIONS

This application is a continuation of U.S. application Ser. No. 17/561,425, filed Dec. 23, 2021, which is a divisional application of U.S. application Ser. No. 16/098,082, filed Oct. 31, 2018, which itself is a national stage entry under 35 U.S.C. § 371 of PCT/US2016/044214, filed Jul. 27, 2016. U.S. application Ser. No. 17/561,425, U.S. application Ser. No. 16/098,082, and PCT/US2016/044214 are incorporated in their entirety herein.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using melting or sintering, and for other materials may be accomplished using digital light projection technology

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 3A through 3D are schematic views depicting another example of a method for forming a 3D printed electronic parts, where the method utilizes an electronic agent, a fusing agent, and a detailing agent;

FIGS. 3E, 3A, 3F and 3G are schematic views depicting still another example of a method for forming a 3D printed electronic part, where the method utilizes an activating agent, an electronic agent, a fusing agent, and a detailing agent;

DETAILED DESCRIPTION

Figure 1:
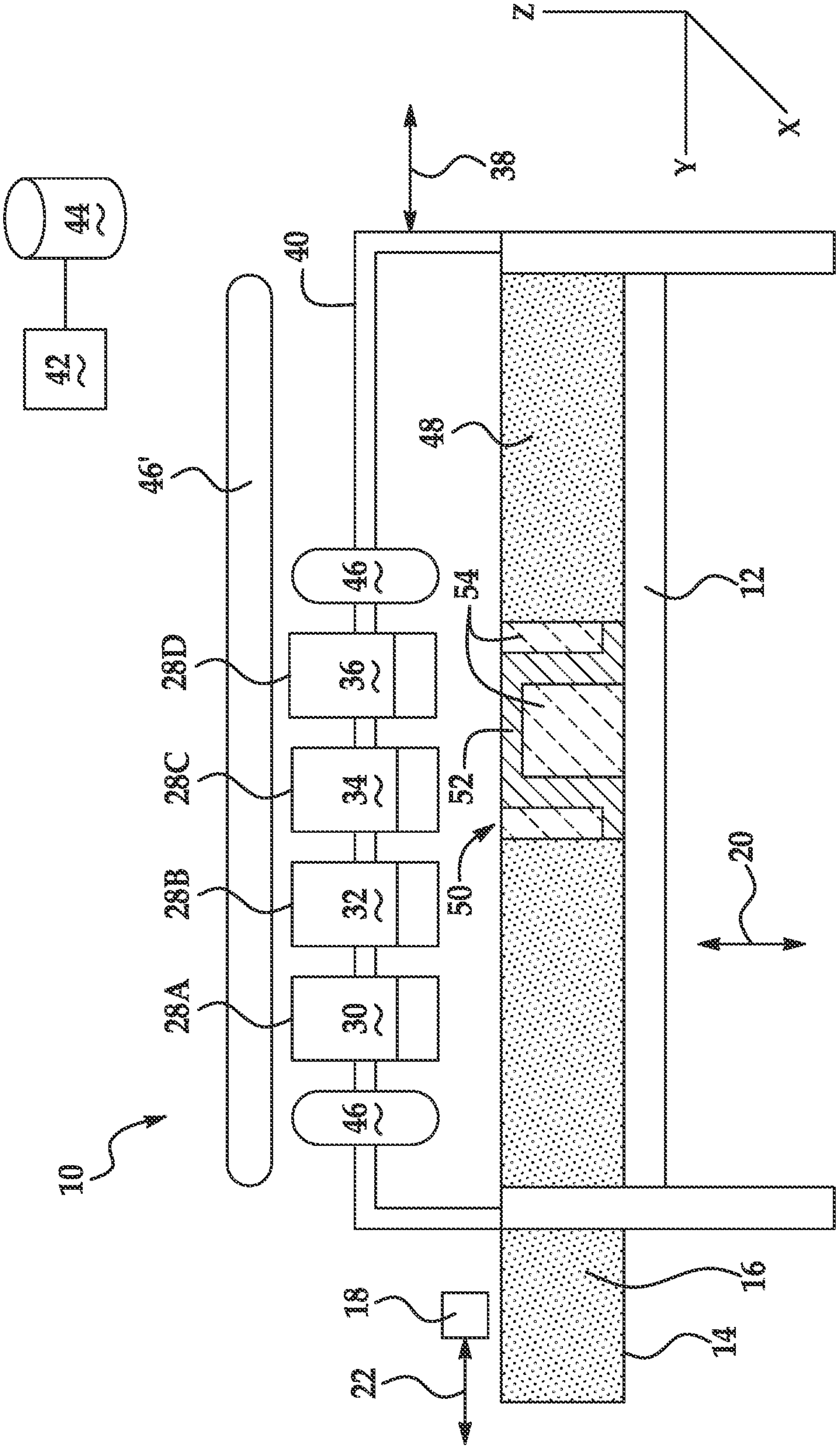
FIG. 1 is a schematic view of an example 3D printing system.

Building and/or embedding electronics (e.g., a conductive element) on and/or within a dense part may require multiple steps to assemble several different components. For example, three-dimensional printing techniques, such as extrusion or additive manufacturing, have been used to create the dense part, and then other techniques, such as electroplating or the application of conducting materials, have been used to create the electronics. Many of the materials used to create the electronics require specific activation procedures, which may utilize specialized (e.g., proprietary, expensive, etc.) equipment, such as annealing equipment.

Examples of the three-dimensional (3D) printing method disclosed herein utilize multi jet fusion (MJF) to form a region of a layer that exhibits an electronic property. During MJF, an entire layer or several layers of a build material (also referred to as build material particles) is/are exposed to electromagnetic radiation, but a selected region (in some instances less than the entire layer(s)) of the build material is fused and hardened to become a layer or several layers of a 3D object/part. In the examples disclosed herein, an electronic agent, in combination with an activating agent and/or a fusing agent, is selectively deposited in contact with the selected region of the build material. The agents are capable of penetrating into the layer of the build material and spreading onto the exterior surface of the build material. The activated electronic agent and/or the fusing agent is capable of absorbing electromagnetic radiation and converting the absorbed radiation to thermal energy, which in turn melts or sinters the build material that is in contact with the activated electronic agent and/or the fusing agent. This causes the build material to fuse, bind, cure, etc. to form the layer of the 3D object/part.

The examples of the method disclosed herein utilize multiple printing passes and multiple heating events, which are controlled in order to obtain parts that exhibit suitable electronic properties (e.g., conductivity or insulation) and mechanical strength, as well as an aesthetically pleasing surface finish. The multi-printing pass and multi-heating event approach manages thermal distribution throughout the process. Managing thermal distribution can ensure that a desirable electronic property (such as conductivity) is obtained, and is not deleteriously affected as a result of overly strong fusing conditions or weak fusing conditions. For example, excessive fusing can cause build material flow which can in turn cause brittle electronic portions to break apart, which could diminish the conductivity. The multi-printing pass and multi-heating event approach also includes enough heating events throughout the process so that the resulting part is mechanically strong (e.g., exhibits at least 80% of the bulk material properties), if desired.

Some examples of the method disclosed herein also utilize controlled cooling. Controlled cooling keeps the build material from experiencing uncontrolled temperature build up within the regions patterned with the electronic agent and/or fusing agent, which can lead to melt down of the parts and/or thermal bleed. During thermal bleed, unpatterned regions of the build material proximate to the patterned regions unintentionally fuse due to heat spreading from the patterned regions to the unpatterned regions. Moreover, if the build material reaches a full melt, it may be more susceptible to curling if the temperature subsequently drops too far below the recrystallization temperature. By heating and cooling the build material several times throughout the process, the build material can effectively fuse without ever becoming too cool (e.g., less than 20 degrees below the recrystallization temperature) and without overheating (e.g., more than 30 degrees over the melting point). The methods disclosed herein enable the build material to be in a controlled, sintered state (i.e., fused, but below that of a low viscosity full melt), which leads to well-formed parts.

Generally, the methods disclosed herein include determining an amount of an electronic agent that corresponds to the desired electronic property, adjusting the processing conditions (e.g., how much of a fusing agent to apply) to achieve the desired fusing temperature in the region(s) of the 3D part that is/are to exhibit the desired electronic property, determining the amount of fusing agent that corresponds to achieving the desired fusing temperature for the region(s) that is/are not to exhibit the desired electronic property, and if applicable, applying additional fusing agent to achieve the desired aesthetics and a detailing agent to achieving the desired fusing temperature. In some examples, adjusting the processing conditions may involve lowering the amount of fusing agent to a level that enables the rest of the part to be processed with the processing conditions for the electronic feature/component. In these examples, the fusing agent may not achieve a desirable color, and thus additional fusing agent could be added with detailing agent to achieve the desirable color and to not over fuse the part.

Referring now to FIG. 1, an example of a 3D printing system 10 is depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The printing system 10 includes a build area platform 12, a build material supply 14 containing build material 16, and a build material distributor 18.

The build area platform 12 receives the build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

The build area platform 12 may be moved in a direction as denoted by the arrow 20, e.g., along the z-axis, so that build material 16 may be delivered to the platform 12 or to a previously formed 3D part layer (i.e., fused build material). In an example, when the build material 16 is to be delivered, the build area platform 12 may be programmed to advance (e.g., downward) enough so that the build material distributor 18 can push the build material 16 onto the platform 12 to form a layer of the build material 16 thereon. The build area platform 12 may also be returned to its original position, for example, when a new part is to be built.

The build material supply 14 may be a container, bed, or other surface that is to position the build material 16 between the build material distributor 18 and the build area platform 12. In some examples, the build material supply 14 may include a surface upon which the build material 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material 16 from a storage location to a position to be spread onto the build area platform 12 or onto a previously formed 3D part layer.

The build material distributor 18 may be moved in a direction as denoted by the arrow 22, e.g., along the y-axis, over the build material supply 14 and across the build area platform 12 to spread a layer of the build material 16 over the build area platform 12. The build material distributor 18 may also be returned to a position adjacent to the build material supply 14 following the spreading of the build material 16. The build material distributor 18 may be a blade (e.g., a doctor blade), a roller, a combination of a roller and a blade, and/or any other device capable of spreading the build material 16 over the build area platform 12. For instance, the build material distributor 18 may be a counter-rotating roller.

As shown in FIG. 1, the printing system 10 also includes an inkjet applicator (shown as 28A, 28B, 28C, 28D in FIG. 1) for dispensing one or more of an electronic agent 30, a fusing agent 32, a detailing agent 34, and an activating agent 36. In one example, the system 10 includes a respective inkjet applicator 28A, 28B, 28C, 28D for each of the agents 30, 32, 34, 36 being used in the method. In this example, one applicator 28A, 28B, 28C, 28D contains a supply of one of the agents 30, 32, 34, 36, as well as fluid slots and fluidics for dispensing the agent 30, 32, 34, 36. As examples, each applicator 28A, 28B, 28C, 28D may be a thermal inkjet printhead or print bar, a piezoelectric printhead or print bar, or a continuous inkjet printhead or print bar. In another example, the system 10 includes one applicator 28A, 28B, 28C or 28D for all of the agents 30, 32, 34, 36 being used in the method. In this example, the applicator 28A, 28B, 28C or 28D may be a single printhead or print bar, which includes a separate fluid slot and fluidics for each of the agents 30, 32, 34, 36 that is to be dispensed from the applicator. As such, while multiple inkjet applicators 28A, 28B, 28C, 28D are shown in FIG. 1, it is to be understood that a single inkjet applicator 28A, 28B, 28C or 28D may be used.

The inkjet applicator(s) 28A, 28B, 28C, 28D may be scanned across the build area platform 12 in the direction indicated by the arrow 38, e.g., along the y-axis. The inkjet applicator(s) 28A, 28B, 28C, 28D may extend a width of the build area platform 12. The inkjet applicator(s) 28A, 28B, 28C, 28D may also be scanned along the x-axis, for instance, in configurations in which the inkjet applicator(s) 28A, 28B, 28C, 28D does/do not span the width of the build area platform 12 to enable the inkjet applicator(s) 28A, 28B, 28C, 28D to deposit the agents over a large area of a layer of build material 16. The inkjet applicator(s) 28A, 28B, 28C, 28D may thus be attached to a moving XY stage or a translational carriage 40 that moves the inkjet applicator(s) 28A, 28B, 28C, 28D adjacent to the build area platform 12 in order to deposit the agents 30, 32, 34, 36 in predetermined areas of a layer of the build material 16 that has been formed on the build area platform 12 in accordance with the method(s) disclosed herein. The inkjet applicator(s) 28A, 28B, 28C, 28D may include a plurality of nozzles (not shown) through which the agent(s) 30, 32, 34, 36 is to be ejected.

Each of these physical elements may be operatively connected to a controller 42 of the printing system 10. The controller 42 may control the operations of the build area platform 12, the build material supply 14, the build material distributor 18, and the applicator(s) 28A, 28B, 28C, 28D. As an example, the controller 42 may control actuators (not shown) to control various operations of the 3D printing system 10 components. The controller 42 may be a computing device, a semiconductor-based microprocessor, a central processing unit (CPU), an application specific integrated circuit (ASIC), and/or another hardware device. Although not shown, the controller 42 may be connected to the 3D printing system 10 components via communication lines.

The controller 42 manipulates and transforms data, which may be represented as physical (electronic) quantities within the printer's registers and memories, in order to control the physical elements to create the 3D part. As such, the controller 42 is depicted as being in communication with a data store 44. The data store 44 may include data pertaining to a 3D part to be printed by the 3D printing system 10. The data for the selective delivery/application of the build material 16, the fusing agent 32, the electronic agent 30, etc. may be derived from a model of the 3D part to be formed. For instance, the data may include the order in which the agents 30, 32, 34, 36 are to be printed and the locations on each layer of build material 16 that the agents 30, 32, 34, 36 are to be deposited. In one example, the controller 42 may use the data to control the inkjet applicator(s) 28A, 28B, 28C, 28D to selectively apply the electronic agent 30 and the fusing agent 32 so that several applications of the electronic agent 30 occur prior to the application of the fusing agent 32. In another example, the controller 42 may use the data to control the inkjet applicator(s) 28A, 28B, 28C, 28D to selectively apply the activating agent 36 before the electronic agent 30, to apply the electronic agent 30 at a maximum loading in several passes, to apply the detailing agent 34 in specific locations to control the temperature of the build material 16, and to apply the fusing agent 32 at the end of the printing process. The data store 44 may also include machine readable instructions (stored on a non-transitory computer readable medium) that are to cause the controller 42 to control the amount of build material 16 that is supplied by the build material supply 14, the movement of the build area platform 12, the movement of the build material distributor 18, the movement of the inkjet applicator(s) 28A, 28B, 28C, 28D, etc.

As shown in FIG. 1, the printing system 10 may also include a radiation source 46, 46'. The radiation source 46, 46' may be used to expose the build area platform 12 (and any build material 16 and/or agent(s) 30, 32, 34, 36 thereon) to electromagnetic radiation that ultimately fuses the build material 16 in contact with the fusing agent 32 (or an electronic agent 30' (FIGS. 4A-4D) which includes a radiation absorber) and/or sinters a component of the electronic agent 30.

The radiation source 46, 46' may be any suitable fusing lamp, examples of which include commercially available infrared (IR) lamps, ultraviolet (UV) lamps, flash lamps, and halogen lamps. Other examples of the radiation source 46, 46' may include microwave radiation sources, xenon pulse lamps, IR lasers, etc. As depicted in FIG. 1, the radiation source 46, 46' may be a stationary lamp 46' or a moving lamp 46. The stationary lamp 46' may be in a fixed position relative to the build area platform 12, and may be turned on when radiation exposure is desired and off when radiation exposure is not desired. The moving lamp(s) 46 can be mounted on a track (e.g., translational carriage 40) to move across the build area platform 12 in a direction as denoted by the arrow 22, e.g., along the y-axis. This allows for printing and heating in a single pass. Such lamps 46 can make multiple passes over the build area platform 12 depending on the amount of exposure utilized in the method(s) disclosed herein. In the example shown in FIG. 1, the lamps 46 are mounted at opposite ends of the inkjet applicator(s) 28A, 28B, 28C, 28D so that heat can be applied to the build material 16 immediately before the agent(s) 30, 32, 34, 36 are deposited and/or immediately after the agent(s) 30, 32, 34, 36 are deposited, depending on the movement of the translational carriage 40. In an example, the moving lamp 46 at the left side of the translational carriage may be a leading lamp and the moving lamp 46 at the right side of the translational carriage may be a trailing lamp.

The radiation source 46, 46' can be configured to irradiate the entire build area platform 12 with a substantially uniform amount of energy. This can selectively fuse the printed portions with fusing agent 32 and/or sinter the printed portions with electronic agent 30, while leaving the unprinted portions of the build material 16 below the melting or softening point.

In one example, the radiation source 46, 46' can be matched with an absorber in the fusing agent 32 (or the electronic/fusing agent 30') so that the radiation source 46, 46' emits wavelengths of light that match the peak absorption wavelengths of the fusing agent 32 (or the electronic/fusing agent 30'). A fusing agent 32 with a narrow peak at a particular near-infrared wavelength can be used with a fusing lamp that emits a narrow range of wavelengths at approximately the peak wavelength of the fusing agent 32. Similarly, a fusing agent 32 that absorbs a broad range of near-infrared wavelengths can be used with a fusing lamp that emits a broad range of wavelengths. Matching the fusing agent 32 (or the electronic/fusing agent 30') and the radiation source 46, 46' in this way can increase the efficiency of coalescing the build material 16 with the fusing agent 32 (or the electronic/fusing agent 30') printed thereon, while the unprinted build material 16 particles do not absorb as much radiation and remain at a lower temperature.

In the example methods disclosed herein, radiation exposure takes place in multiple passes. Radiation exposure may take place to preheat the build material 16, to sinter the electronic agent 30, and/or to fuse the build material 16 in contact with the fusing agent 32 (or the electronic/fusing agent 30'). Depending, at least in part, on the amount of the electronic agent 30, fusing agent 32 and/or detailing agent 34 present in the build material 16, the absorbance of the radiation absorber, the preheat temperature, the radiation source power, and the melting or softening point of the build material 16, an appropriate amount of irradiation can be supplied from the radiation source 46, 46'. When the moving lamps 46 are used, the carriage 40 speed and the length of the lamp(s) may also affect the irradiation time. In some examples, the radiation source 46, 46' can irradiate each layer of build material from about 0.025 seconds (25 milliseconds) to about 1 second per heating event. This time range may be suitable, for example, when the carriage pass speed ranges from about 4 inches per second to about 40 inches per second and the radiation source 46 ranges from about 1 inch to about 4 inches in length. In other examples when a lower power lamp is used, the heating event time may be up to 10 seconds. In still other examples when a higher power lamp is used, the heating event time may be down to 1 microsecond.

FIG. 1 also illustrates layers 48 of build material 16 on the build area platform 12 and a three-dimensional (3D) part 50 formed from some of the build material 16 in the layers 48.

In some of the examples disclosed herein, the 3D part 50 includes a conductive region 52 and an insulating region 54. The 3D part 50 is made up of several fused layers, and each layer may include conduction region(s) and/or insulating region(s) depending upon the 3D part 50 that is being formed. Examples of the methods for forming the three-dimensional part 50, including the conductive region 52 and the insulating region 54 will be described further in reference to FIGS. 2A-2C, 3A-3G, and 4A-4D.

Figure 2A:
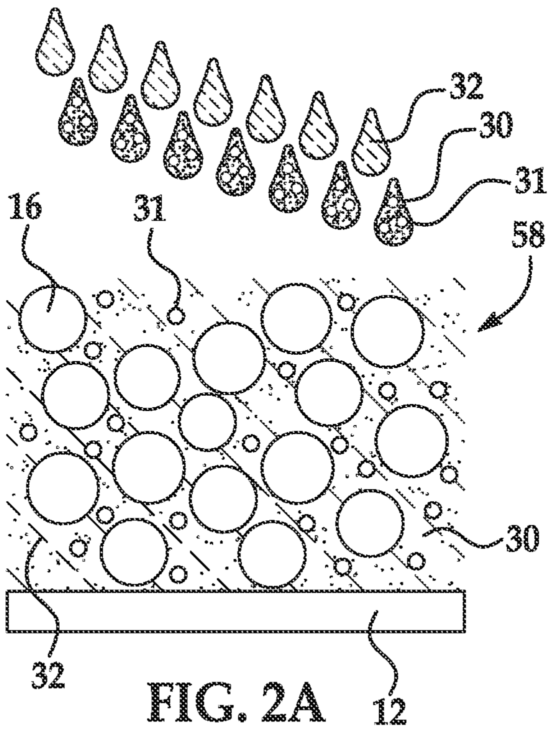
FIGS. 2A through 2C are schematic views depicting one example of a method for forming a 3D printed electronic part.
Figure 2B:
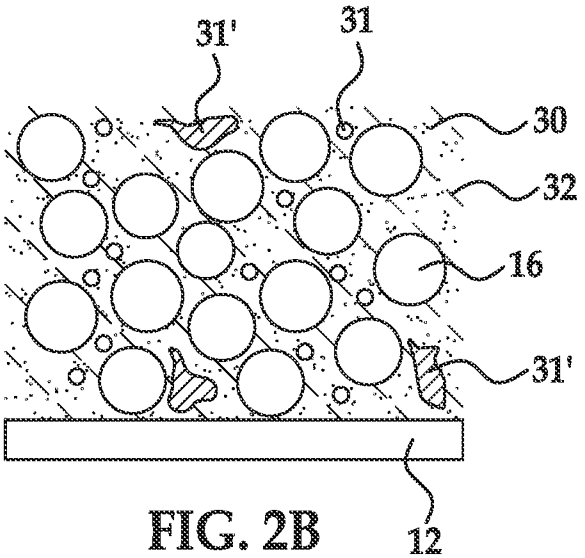
Figure 2C:
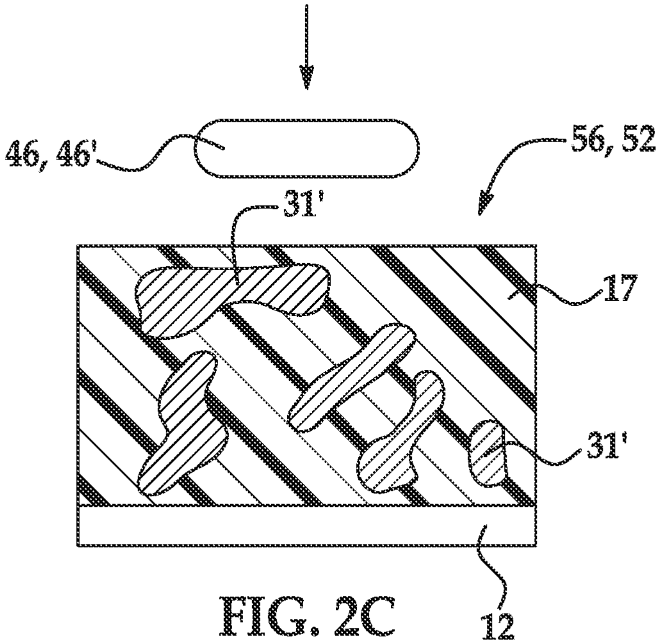

One example of the method is shown in FIGS. 2A through 2C. This example involves the formation of a fused layer 56 (FIG. 2C), which forms at least part of the conductive region 52 in the final 3D part 50.

The method involves applying the build material 16. While not shown, applying the build material 16 may involve the build material supply 14 supplying the build material 16 into a position so that they are ready to be spread onto the build area platform 12. The build material distributor 18 may spread the supplied build material 16 onto the build area platform 12. The controller 42 may execute control build material supply instructions to control the build material supply 14 to appropriately position the build material 16, and may execute control spreader instructions to control the build material distributor 18 to spread the supplied build material 16 over the build area platform 12 to form a layer 58 of build material 16 thereon. As shown in FIG. 2A, one layer 58 of the build material 16 has been applied.

The layer 58 has a substantially uniform thickness across the build area platform 12. In an example, the thickness of the layer ranges from about 50 μm to about 300 μm, although thinner or thicker layers may also be used. For example, the thickness of the layer 58 may range from about 20 μm to about 500 μm, or from about 30 μm to about 300 μm.

The build material 16 may be a polymeric build material, a ceramic build material, a metallic build material, or a composite build material.

The polymeric build material may be crystalline or semi-crystalline polymers in powder form. Examples of crystalline or semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other examples of crystalline or semi-crystalline polymers suitable for use as the build material 16 include polyethylene, polypropylene, and polyoxomethylene (i.e., polyacetals). Still other examples of suitable polymeric build materials 16 include polystyrene, polycarbonate, polyester, polyurethanes, other engineering plastics, and blends of any two or more of the polymers listed herein. Core shell polymer particles of these materials may also be used.

Other examples of the build material 16 include ceramic particles. Examples of suitable ceramic particles include oxides, carbides, and nitrides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. As an example, 30 wt % glass may be mixed with 70 wt % alumina.

Examples of the metal build material include copper (Cu), zinc (Zn), niobium (Nb), tantalum (Ta), silver (Ag), gold (Au), platinum (Pt), palladium (Pd), indium (In), bismuth (Bi), tin (Sn), lead (Pb), gallium (Ga), and alloys thereof. While more costly, osmium (Os), rhodium (Rh), ruthenium (Ru), and iridium (Ir) may also be used.

Composite build materials may include mixtures of polymer particles and inorganic particles. As examples, any of the previously listed polymer particles may be combined with any of the previously listed ceramic particles to form the composite build material.

The build material 16 may have a melting or softening point ranging from about 50° C. to about 4000° C. As examples, ceramic particles having a melting point ranging from about 600° C. to about 4000° C. may be used, metal particles having a melting point ranging from about 200° C. to about 3500° C. may be used, or polymers having a melting or softening point ranging from about 75° C. to about 400° C. may be used.

The build material 16 may be made up of similarly sized particles or differently sized particles. The term "size" or "particle size" is used herein to describe at least the build material 16. The size or particle size generally refers to the diameter or average diameter, which may vary, depending upon the morphology of the individual particle. In an example, the respective particle may have a morphology that is substantially spherical. A substantially spherical particle (i.e., spherical or near-spherical) has a sphericity of >0.84. Thus, any individual particles having a sphericity of <0.84 are considered non-spherical (irregularly shaped). The particle size of the substantially spherical particle may be provided by its largest diameter, and the particle size of a non-spherical particle may be provided by its average diameter (i.e., the average of multiple dimensions across the particle) or by an effective diameter, which is the diameter of a sphere with the same mass and density as the non-spherical particle.

In an example, the average size of the particles of the build material 16 ranges from about 0.01 μm to about 500 μm. As an example, the polymeric and/or metal build material may have a particle size ranging from about 5 μm to less than 200 μm. As another example, the ceramic build material may have a particle size ranging from about 0.05 μm to about 100 μm.

It is to be understood that build material 16 may include, in addition to the polymer, ceramic, metal or composite particles, a charging agent, a flow aid, or combinations thereof. Charging agent(s) may be added to suppress tribo-charging. Flow aid(s) may be added to improve the coating flowability of the build material 16. In an example, each of the charging agent and/or the flow aid may be added in an amount ranging from greater than 0 wt % to less than 5 wt % based upon the total wt % of the build material 16 used.

After the build material 16 is applied, the electronic agent 30 and the fusing agent 32 are selectively applied, and the build material layer 58 (with and/or without agents 30, 32 thereon) is exposed to electromagnetic radiation. FIGS. 2A through 2C specifically depict the final printing pass and heating event of the method. The details of this example of the method will be described further below.

The electronic agent 30 may be used to impart any electronic property to region(s) of the layer and/or part that is formed. The electronic property may be electrical conductivity, semi-conductivity, and/or an electrically insulating property. As examples, the region(s) exhibiting the electronic property may form anti-static surface coatings (e.g., scratch-tolerant surface conductivity for static-related applications), capacitors, resistors, inductors, conductive traces, vias, and more complex geometry electronic components.

The electronic agent 30 may be an aqueous formulation that includes a conductive material, a semi-conductive material, and/or an insulating material. The electronic agent 30 may include one of the materials, or a combination of the materials in order to enhance the compatibility with a particular build material and/or to enhance the electronic property. For examples, the electronic agent 30 may include a combination of conductive materials to enhance the conductive electronic property, or may include a combination of a semi-conductive material and an insulating material to modify the electronic property. Some specific examples of material combinations include: a combination of carbon nanotubes, silver nanoparticles and a PEDOT:PSS polymer to enhance conductive properties; a combination of quantum dots and semi-conducting polymers to enhance semi-conducting properties; a combination of insulating polymer and insulating nanoparticles to enhance insulating properties; and a combination of silver nanoparticles and carbon black to create an electronic feature with a specific conductivity, for instance, a resistor of specific resistance.

In an example, the electronic agent 30 may be an aqueous formulation that includes a conductive material 31. Examples of the conductive material 31 include transition metal (e.g., silver, copper, gold, platinum, palladium, chromium, nickel, zinc, tungsten, etc.) nanomaterials (e.g., nanoparticles, nanorods, nanowires, nanotubes, nanosheets, etc.). The conductive material 31 may also include metal alloy nanomaterials, such as Au—Ag, Ag—Cu, Ag—Ni, Au—Cu, Au—Ni, Au—Ag—Cu, or Au—Ag—Pd.

Examples of other conductive materials 31 include conductive oxides (e.g., indium tin oxide, antimony oxide, zinc oxide, etc.), conducting polymers (e.g., poly(3,4-ethylenedioxythiophene) polystyrene sulfonate (PEDOT:PSS), polyacetylene, polythiophenes, any other conjugated polymer, etc.), carbonaceous nanomaterials (e.g., graphene (single or multi-layer), carbon-nanotubes (CNTs, single or multi-walled), graphene nanoribbons, fullerenes, etc.), and reactive metal systems.

Examples of reactive metal systems for use in the electronic agent 30 can include a transition metal in the form of a metal organic decomposition salt or metal oxide. Under certain conditions, the metal organic decomposition salt or metal oxide in the electronic agent 30 can form elemental conductive nanomaterials 31 in situ after being printed onto the build material 16. The elemental conductive nanomaterials 31 formed can then be sintered together to form a conductive matrix 31' (see FIG. 2B). In some examples, a reducing agent can be reacted with the metal salt or metal oxide to produce elemental conductive nanomaterials 31. In one example, a reducing agent can be underprinted onto the powder bed before the electronic agent 30. In another example, a reducing agent can be overprinted over the electronic agent 30. In either case, the reducing agent can be reacted with the metal salt or metal oxide to form elemental conductive nanomaterials 31 before the build material 16 is cured. Suitable reducing agents can include, for example, glucose, fructose, maltose, maltodextrin, trisodium citrate, ascorbic acid, sodium borohydride, ethylene glycol, 1,5-pentanediol, 1,2-propylene glycol, hydrazine, formic acid, and others.

In some examples, the conductive material 31 may be other non-transition metal nanomaterials. The non-transition metal nanomaterials can include lead, tin, bismuth, indium, gallium, and others. In some examples, soldering alloys may be included. The soldering alloys can include alloys of lead, tin, bismuth, indium, zinc, gallium, silver, copper, in various combinations. In certain examples, the soldering alloys can be printed in locations that are to be used as soldering connections for printed electrical components. The soldering alloys can be formulated to have low melting temperatures useful for soldering, such as less than 230° C. Examples of the semi-conductive material that may be used in the electronic agent 30 include semi-conducting nanomaterials (nanoparticles, nanorods, nanowires, nanotubes, nanosheets, etc.), semi-conducting metal oxides (e.g., tin oxide, antimony oxide, indium oxide, etc.), semi-conducting polymers (e.g., PEDOT:PSS, polythiophenes, poly(p-phenylene sulfide), polyanilines, poly(pyrrole)s, poly(acetylene)s, poly(p-phenylene vinylene), polyparaphenylene, and any other conjugated polymer, etc.), and semi-conducting small molecules (i.e., having a molecular mass less than 5,000 Daltons, e.g., rubrene, pentacene, anthracene, aromatic hydrocarbons, etc.). Some specific examples of the semi-conducting nanomaterials include quantum dots, III-V or II-VI semiconductors, Si, Ge, transition metal dichalcogenides (WS2, WSe2, MoSes, etc.), graphene nanoribbons, semiconducting carbon nanotubes, and fullerenes and fullerene derivatives.

The previously described fullerenes, conducting or semi-conducting metal oxides, and conducting or semi-conducting polymers may be semi-conductive, in that they have a finite conductivity. However, this conductivity may often be sufficient for conductive applications. The material may be considered conductive or semi-conductive depending upon the geometry and/or in what combination with other electronic components it is utilized.

Examples of the insulating (dielectric) material that may be used in the electronic agent 30 include insulating nanomaterials (nanoparticles, nanorods, nanowires, nanotubes, nanosheets, etc.), colloids, or sol-gel precursors, such as hexagonal boron nitride, metal and semiconducting oxides, metal and semiconducting nitrides, metal oxide sol-gel precursors (e.g., metal alkoxides, metal chlorides, etc.), silicon sol-gel precursors (silicates), or solid electrolytes. Other examples of the insulating material include insulating polymers (e.g., polylactic acid, fluoropolymers, polycarbonate, acrylics, polystyrene, SU-8, ete.) and insulating small molecules (i.e., having a molecular mass less than 5,000 Daltons, e.g., benzocyclobutane, paraffins, organic dyes, etc.).

While the examples disclosed herein refer to the conductive material/nanomaterials 31, it is to be understood that any of the other materials, such as semi-conductive materials and/or insulating materials may be used instead of or in combination with the conductive nanomaterials 31. It is to be understood that the electronic material in the electronic agent 30 will depend upon the type of electronic property that is to be imparted to the region(s).

The average particle size, diameter, or other dimension of the conductive materials 31, semi-conductive materials, and/or insulating materials may range from about 1 nm to about 200 nm.

The conductive nanomaterials 31 (or semi-conductive materials, if used) may be stabilized by a dispersing agent at surfaces thereof. In one example, the dispersing agent is a weakly bound ligand that passivates the surface of the conductive nanomaterials 31. These weakly bound ligands may be molecules that attach to the nanomaterial surface through a sulfonic acid, phosphonic acid, carboxylic acid, dithiocarboxylic acid, phosphonate, sulfonate, thiol, carboxylate, dithiocarboxylate, amine, or pyridine functional group. As an example, the weakly bound ligand may contain an alkyl group having from 3-20 carbon atoms, with one of the above moieties at an end of the alkyl chain. Examples of such molecules include dodecanoic acid, triethylenetetramine or another alkylamine, an alkylthiol, or 4-dimethylaminopyridine.

In further examples, the dispersing agent may be a polymeric dispersing agent, such as polyvinylpyrrolidone (PVP), polyvinylalcohol (PVA), polymethylvinylether, poly(acrylic acid) (PAA), nonionic surfactants, and polymeric chelating agents. These dispersing agents can bind to the surfaces of the elemental transition metal nanomaterials through chemical and/or physical attachment. Chemical bonding can include a covalent bond, hydrogen bond, coordination complex bond, ionic bond, or combinations thereof. Physical attachment can include attachment through van der Waal's forces, dipole-dipole interactions, or a combination thereof.

In an example, the electronic agent 30 can be a silver ink that includes silver nanoparticles dispersed by a dispersing agent. Examples of commercially available silver inks include Mitsubishi® NBSIJ-MU01 available from Mitsubishi Paper Mills Limited, Methode® 9101 available from Methode Electronics, Inc., Methode® 9102 available from Methode Electronics, Inc., NovaCentrix™ JS-B40G available from NovaCentrix, and others.

The concentration of conductive nanomaterials 31 (or other suitable conductive, semi-conductive, and/or insulating material) in the electronic agent 30 may vary. However, higher conductive material concentrations may provide better conductivity due to a larger amount of conductive material being deposited on the build material 16. When lower conductive material concentrations are used, more electronic agent 30 may be applied to achieve the desired amount of conductive material 31, and therefore the desired amount of conductivity, in the conductive region 52 of the 3D part 50. As an example, to achieve desirable conductivity, the electronic agent 30 may include at least 15 wt % of silver nanoparticles, and be applied in an amount sufficient to include at least 20 wt % of silver nanoparticles in the conductive region 52. In other examples, the electronic agent 30 can contain from about 5 wt % to about 50 wt % of the conductive nanomaterials 31 (or other suitable conductive, semi-conductive, and/or insulating material), with respect to the entire weight of the electronic agent 30. In further examples, the electronic agent 30 can contain from about 10 wt % to about 30 wt % of the conductive nanomaterials 31 (or other suitable conductive material), with respect to the entire weight of the electronic agent 30.

In addition to the conductive material 31 (or other suitable conductive, semi-conductive, and/or insulating material), the aqueous formulation of the electronic agent 30 may also include water, a co-solvent, a surfactant, a pH adjuster, a biocide, and/or an anti-kogation agent.

Examples of suitable co-solvents include 2-pyrrolidinone, N-methylpyrrolidone, 1-(2-hydroxyethyl)-2-pyrrolidinone, 1,6-hexanediol or other diols (e.g., 1,5-Pentanediol, 2-methyl-1,3-propanediol, etc.), triethylene glycol, tetraethylene glycol, tripropylene glycol methyl ether, or the like, or combinations thereof. Whether used alone or in combination, the total amount of the co-solvent(s) ranges from about 1 wt % to about 60 wt % of the total wt % of the electronic agent 30.

Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the electronic agent 30 may range from about 0.5 wt. % to about 1.5 wt. % based on the total wt. % of the electronic agent 30.

pH adjusters may be used to control the pH of the electronic agent 30. From 0 wt % to about 2 wt % (of the total wt % of the electronic agent 30) of the pH adjuster, for example, can be used.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). The biocide or antimicrobial may be added in any amount ranging from about 0.1 wt. % to about 5 wt. % with respect to the total wt. % of the electronic agent 30.

An anti-kogation agent may be included in the electronic agent 30. Kogation refers to the deposit of dried ink (e.g., electronic agent 30) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., $<5,000$) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the electronic agent 30 may range from about 0.1 wt. % to about 5 wt. % based on the total wt. % of the electronic agent 30.

Examples of the fusing agent 32 are water-based dispersions including a radiation absorbing binding agent (i.e., an active material). The amount of the active material in the fusing agent 32 may depend upon how absorbing the active material. In an example, the fusing agent 32 may include the active material and be applied in an amount sufficient to include at least 0.01 wt % of the active material in the 3D part 50. When the active material is black, even this low amount can produce a black colored part. Higher weight percentages may darken the color.

The active material may be any infrared light absorbing colorant. In an example, the active material is a near infrared light absorber. Any near infrared colorants, e.g., those produced by Fabricolor, Eastman Kodak, or Yamamoto, may be used in the fusing agent 32. As one example, the fusing agent 32 may be an ink formulation including carbon black as the active material. Examples of this ink formulation are commercially known as CM997A, 516458, C18928, C93848, C93808, or the like, all of which are available from Hewlett-Packard Company. As another example, the fusing agent 32 may be an ink formulation including near infrared absorbing dyes as the active material. Examples of this ink formulation are described in U.S. Pat. No. 9,133,344, incorporated herein by reference in its entirety. Some examples of the near infrared absorbing dye are water soluble near infrared absorbing dyes selected from the group consisting of:

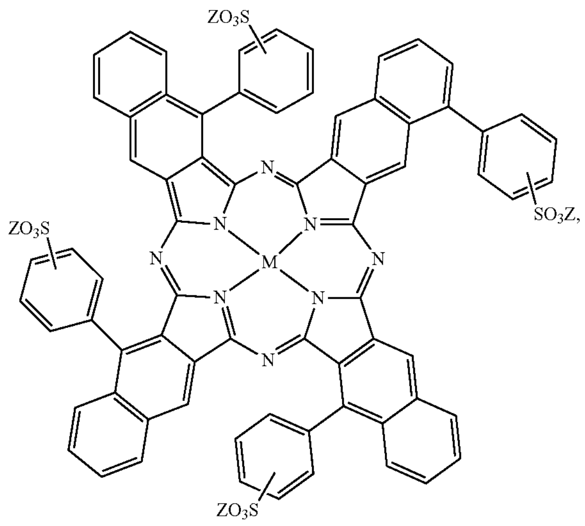
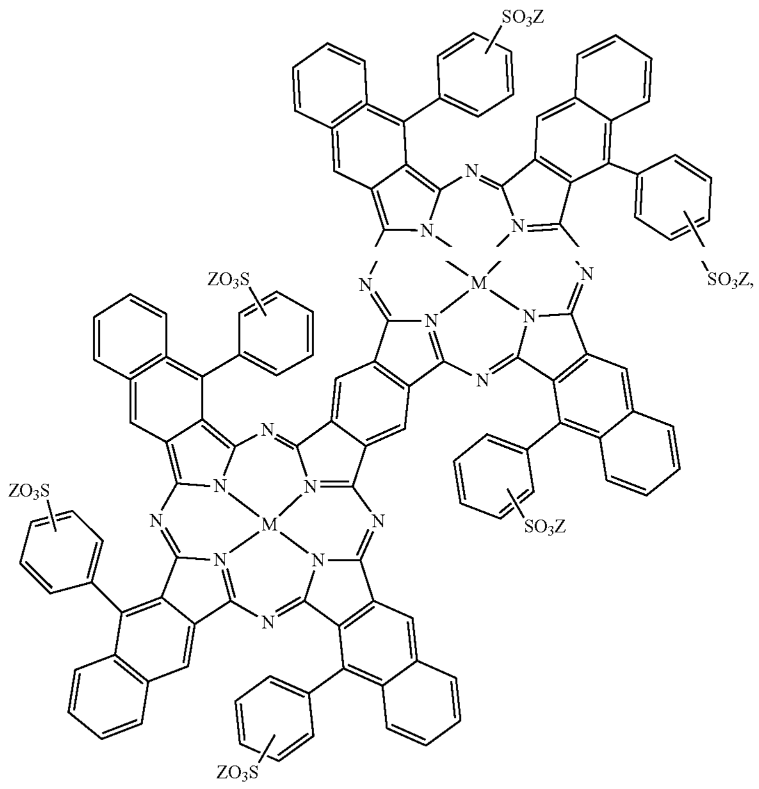
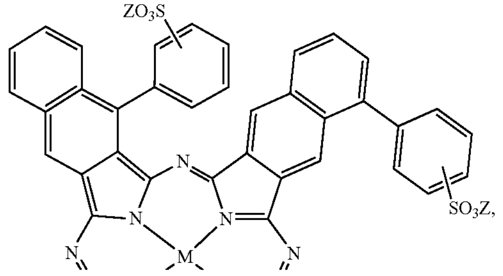

-continued

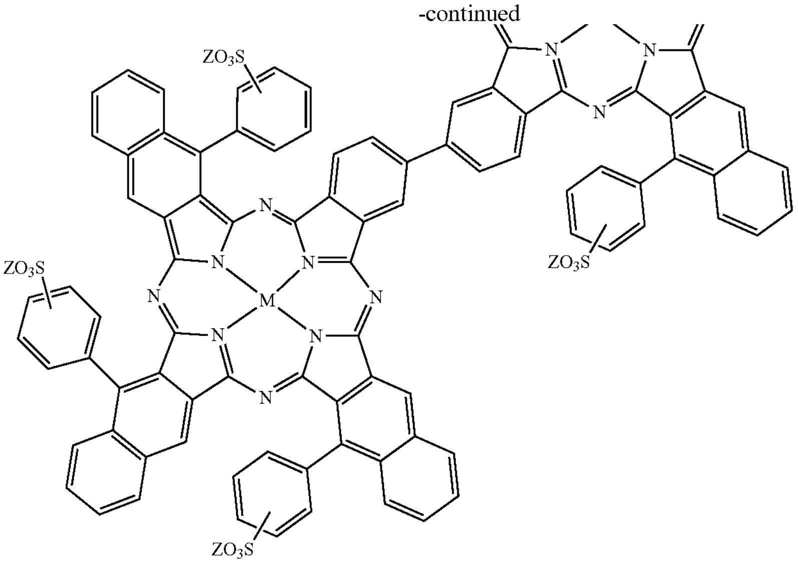

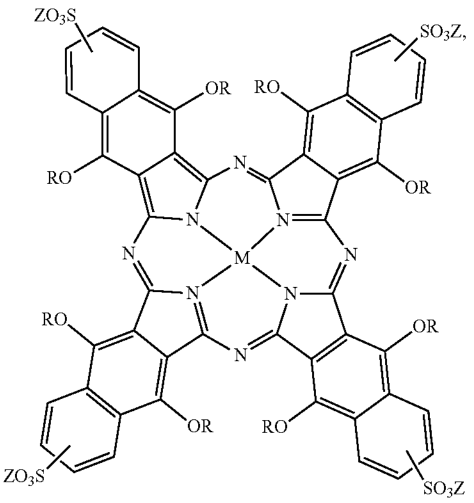

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be any C1-C8 alkyl group (including substituted alkyl and unsubstituted alkyl), and Z can be a counterion such that the overall charge of the near infrared absorbing dye is neutral. For example, the counterion can be sodium, lithium, potassium, $NH_4^+$, etc.

Some other examples of the near infrared absorbing dye are hydrophobic near infrared absorbing dyes selected from the group consisting of:

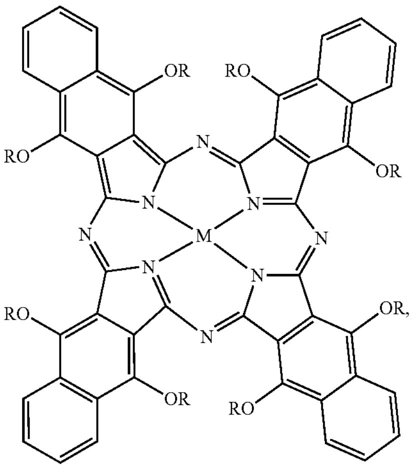

-continued

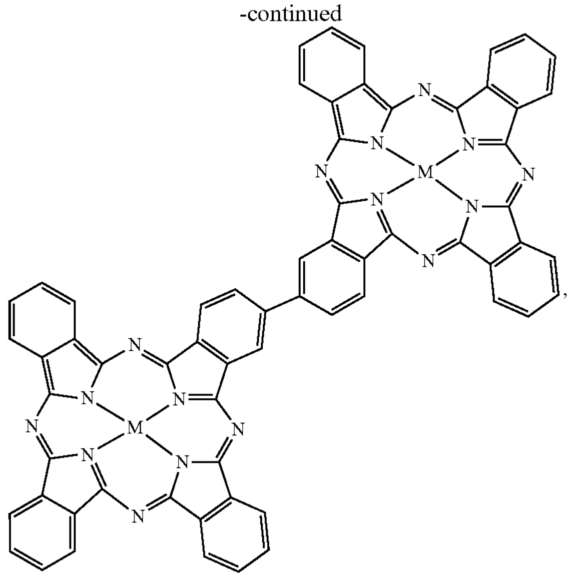

,

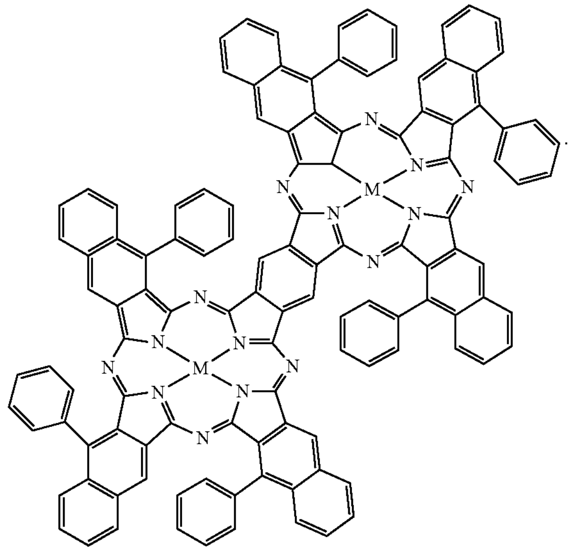

.

and mixtures thereof. For the hydrophobic near infrared absorbing dyes, M can be a divalent metal atom (e.g., copper, etc.) or can include a metal that has Cl, Br, or OR' (R'═H, $CH_3$, $COCH_3$, $COCH_2COOCH_3$, $COCH_2COCH_3$) axial groups filling any unfilled valencies if the metal is more than divalent, and R can be any C1-C8 alkyl group (including substituted alkyl and unsubstituted alkyl).

The fusing agent 32 is an aqueous formulation that may also include any of the previously listed co-solvent(s), surfactant(s), pH adjuster(s), biocide(s), and/or anti-kogation agent(s) in the previously described amounts (except that the wt % is based on the total wt % of the fusing agent 32). The aqueous nature of the fusing agent 32 enables the fusing agent 32 to penetrate, at least partially, into the layer 58 of the build material 16. The presence of a co-solvent and/or a surfactant in the fusing agent 32 may assist in obtaining a particular wetting behavior.

As mentioned above, the example method shown in FIGS. 2A through 2C involves the selective application of the electronic agent 30 and the fusing agent 32 and the exposure of the build material 16 to electromagnetic radiation to ultimately form a fused layer 56. It is generally desirable for the fused layer 56 to be mechanically strong and for the conductive region 52 to exhibit a sufficient electronic property for the application in which the 3D part 50 will be used. Exposure to high heat can create a mechanically strong part, but can also deleteriously affect electronic properties, such as conductivity. In this example of the method, the electronic agent 30 is applied in a plurality of passes, the fusing agent 32 is applied in a single pass, and several heating events are performed throughout the passes, and the order of the passes and events are controlled in order to control the mechanical property and the electronic property of the fused layer 56 that is formed.

In an example, to control the conductive or semi-conductive property, the electronic agent 30 may be applied at a maximum loading in several printing passes (2 or more) and the fusing agent 32 may be applied during the final printing pass alone (so that radiation absorption does not occur during each heating event when a highly absorbing active material is utilized). In other examples to control the conductive or semi-conductive property, an applicator 28A may be selected that dispenses high enough drop weights of the electronic agent 30 to achieve the desired conductivity without utilizing maximum loadings.

To control the mechanical property, a suitable number of heating events are utilized, but the heating events are spread out throughout the printing passes to avoid over-heating and to manage thermal distribution.

As an example of this method, one or two heating events may be performed prior to the selective application of either the electronic agent 30 or the fusing agent 32. The heating event(s) may be performed to preheat the build material 16, and thus the heating temperature may be below the melting point or softening point of the build material 16. As such, the temperature selected will depend upon the build material 16 that is used. As examples, the heating temperature may be from about 5° C. to about 50° C. below the melting point or softening point of the build material 16. The preheating event(s) may be accomplished using any suitable heat source (e.g., radiation source 46, 46') that exposes all of the build material 16 to the heat. As an example of two preheating events, both of the moving lamps 46 may be turned on and passed over the build material 16 one time.

After preheating, a first printing pass may be performed, during which the electronic agent 30 is selectively applied on portion(s) of the build material 16 that are to become conductive region(s) 52 in the fused layer 56. In other examples, the electronic agent 30 is selectively applied on portion(s) of the build material 16 that are to become semi-conductive region(s) or insulating region(s), depending upon the type of electronic material that is contained within the electronic agent 30. The electronic agent 30 may be dispensed using the applicator 28A, and may be dispensed at a maximum loading (e.g., 255 contone (which refers to the number of drops, which is divided by 256, that will be placed on average onto each pixel)). The maximum loading may vary depending on the print resolution, drop weight of the applicator 28A, 28B, 28C, 28D, the concentration of the agent, the number of passes, the effective printing slots of the applicator 28A, 28B, 28C, 28D, and the thickness of the build material layer 58. As an example, for a 1200×1200 dpi (drops per inch), 140 mg/cc of solid silver may be dispensed using a 15% solids electronic agent 30 with three passes from one slot at a drop weight of 14 ng onto a 100 nm thick layer 58.

The first printing pass may be associated with one heating event. For example, immediately before, during, or immediately after the electronic agent 30 is dispensed, the build material 16 may be exposed to a heating event using radiation source 46, 46'. For this heating event, one of the moving lamps 46 may be turned on, or the overhead lamp 46' may be used. It may be desirable for the heating event to take place immediately following the application of the electronic agent 30, and thus the lamp 46 that is turned on may depend upon its position with respect to the applicator 28A and well as the printing direction.

One or more additional printing passes, during which the electronic agent 30 is selectively dispensed, may then be performed, and each of these additional printing passes may be associated with a heating event (e.g., the passes may be immediately preceded by one heating event, or immediately followed by one heating event, or preceded and followed by respective heating events). When one heating event is performed, one of the moving lamps 46 or the overhead lamp 46' may be used, and when two heating events are performed, both of the moving lamps 46 may be turned on or the overhead lamp 46' may be turned on for a longer period of time.

The plurality of printing passes are used to increase the amount of electronic agent 30 (and thus, in this example, the amount of the conductive nanomaterials 31) that is applied to a single layer of build material 16. The plurality of heating events are used to counteract a cooling effect that may be brought on by the large amount of electronic agent 30 that is applied, to evaporate liquid from the applied electronic agent 30, to heat the build material 16 without fusing/curing the build material 16 (because the fusing agent 32 has not yet been dispensed), and/or to begin to sinter the nanomaterials 31 to form a conductive matrix 31'. The timing of any of the heating event(s) may depend, in part, on the melting or softening point of the build material 16, the type and amount of any agent(s) 30, 32, 34, 36 that are applied to the build material, etc.

As the conductive materials 31 are reduced in size, the temperature at which the materials 31 are capable of being sintered can also be reduced. Therefore, using elemental transition metal nanomaterials or other conductive nanomaterials 31 in the electronic ink 30 can allow the nanomaterials 31 to sinter and form a conductive matrix 31' of sintered nanomaterials at relatively low temperatures. For example, the conductive materials 31 in the electronic agent 30 can be capable of being sintered at or below the temperature reached during fusing/curing (i.e., the final heating event). The particular temperatures used in the heating events throughout the process can vary depending on the melt, softening, or fusing temperature of the particular build material 16 used. In an example, the conductive nanomaterials 31 can be capable of being sintered at a temperature ranging from 20° C. to 400° C., which may be achieved during the heating event(s) immediately following the application of the electronic agent 30 without the fusing agent 32. As used herein, the temperature at which the conductive materials 31 are capable of being sintered refers to the lowest temperature at which the materials 31 will become sintered together, forming a conductive matrix 31' of sintered materials. It is to be understood that temperatures above this lowest temperature will also cause the materials 31 to become sintered.

It is to be understood that after any of printing pass/heating event combinations, and prior to the next printing pass, the build material 16 may be allowed to cool to a threshold temperature. In one example, the cooling may be passive cooling. The mechanism for passive cooling may be thermal radiation escaping from the heated portion(s) of the layer 58, convection to the surrounding environment, and/or conduction into cooler portions of the layer 58. When the layer 58 is not the first layer (i.e., the bottom most layer of the part 50 being formed), the mechanism for passive cooling may additionally include conduction into cooler, previously fused layers below the layer 58. Passive cooling involves the system 10 waiting to perform the next printing pass until the temperature of the build material 16 reaches the threshold temperature. The threshold temperature generally ranges from about 10° C. below to about 100° C. below the melting or softening point of the build material 16 that is being used. The system 10 may include a temperature sensor, thermal imaging camera, thermocouple, etc. to determine when the threshold temperature is reached. The timing for passive cooling may be different following different heating events, depending, in part upon the temperature of the build material 16 (which can depend upon the amount of electronic agent 30 applied in any given pass).

During a final printing pass of this example method, both the electronic agent 30 and the fusing agent 32 are dispensed on at least a portion of the build material layer 58. This is depicted in FIG. 2A. In this example, the electronic agent 30 and the fusing agent 32 are dispensed onto the same portion(s), which have already been exposed to electronic agent 30 and heating events. The portion(s) will form a conductive region 52 (or semi-conductive or insulating depending upon the electronic agent 30 that is used) of the fused layer 56. Both the electronic agent 30 and the fusing agent 32 are capable of penetrating into the spaces between the build material particles 16, as shown in FIG. 2B. Moreover, it is to be understood that some of the conductive nanomaterials 31 from the previously dispensed electronic agent 30 may already be sintered when the final printing pass takes place, and that the freshly applied electronic agent 30 and the fusing agent 32 are capable of penetrating into the spaces between the build material particles 16 and the conductive transition metal matrix 31' that has formed.

Immediately preceding, during, or immediately following the final application of the electronic agent 30 and the application of the fusing agent 32, the build material 16 can be exposed to a final heating event, as shown in FIG. 2C. During this heating event, the fusing agent 32 facilitates fusing of the build material particles 16 in contact therewith by absorbing energy from the electromagnetic radiation and converting the energy to heat. This raises the temperature of the build material 16 (in contact with the fusing agent 32) above the melting or softening point of the build material 16. As such, the build material 16 fuses together to form a matrix of fused build material 17. When the electronic agent 30 and the fusing agent 32 are applied in the same portion(s), the electronic agent 30 may have a cooling effect due to the relatively large amount of electronic agent 30 that may be dispensed to achieve the desired electrical property. As such, the amount of fusing agent 32 applied should account for this cooling effect so that the portion(s) are heated to or above the melting or softening point of the build material 16. Similarly, when the electronic/fusing agent 30' includes the radiation absorber (discussed further in reference to FIGS. 4A-4D), the amount of the radiation absorber included in the electronic/fusing agent 30' should account for the cooling effect of the electronic/fusing agent 30' so that the portion(s) are heated to or above the melting or softening point of the build material 16.

Additionally during the final heating event, the conductive nanomaterials 31 in the electronic ink 30 can form additional conductive matrices 31' that becomes interlocked with the fused build material 17.

In the example shown in FIG. 2C, the entire fused layer 56 is conductive.

It is to be understood that the various passes and heating events described in reference to FIGS. 2A through 2C are performed on a single layer 58 of the build material 16 (i.e., prior to the application of additional build material 16). After the fused layer 56 is formed, a new layer of build material 16 may be applied to the fused layer 56 and the various passes and heating events may be repeated to form another fused layer on the fused layer 56. These processes may be repeated as many times is desirable to form the final 3D part 50.

Another example of the method is shown in FIGS. 3A through 3D. This example is similar to the example described in reference to FIGS. 2A through 2C, except that the fusing agent 32 is applied to form both a conductive region 52 and an insulating region 54, and the detailing agent 34 is applied for thermal management.

As shown in FIG. 3A, this example method involves applying the build material 16. The build material 16 may be applied to form a layer 58 as previously described.

After the build material 16 is applied, the electronic agent 30 is selectively applied to a portion 60 of the build material layer 58 in a plurality of passes, the fusing agent 32 is selectively applied to the portion 60 and to another portion 62 in a single pass, the detailing agent 34 is applied to at least the portion 62 in a single pass or a plurality of passes, and several heating events are performed throughout the passes. The order of the passes and heating events is controlled in order to control the mechanical property and the conductive property of the fused layer 56' that is formed. It is to be understood that FIGS. 3A through 3D specifically depict the final printing pass and heating event of the method to form the fused layer 56'.

In an example, to control the conductive or semi-conductive property, the electronic agent 30 is applied at a maximum loading in several printing passes (2 or more) and the fusing agent 32 is applied during the final printing pass alone (so that radiation absorption does not occur during each heating event when a highly absorbing active material is utilized). In other examples to control the conductive or semi-conductive property, an applicator 28A may be selected that dispenses high enough drop weights of the electronic agent 30 to achieve the desired conductivity without utilizing maximum loadings.

To control the mechanical property, a suitable number of heating events are utilized, but the heating events are spread out throughout the printing passes to avoid over-heating and to manage thermal distribution. Also to control the mechanical property, the detailing agent 34 is utilized for thermal management (i.e., controls a maximum temperature that the build material 16 in contact therewith can reach).

As an example of this method, one or two heating events may be performed prior to the selective application of any of the agents 30, 32, 34. This heating event may be performed to preheat the build material 16 in the manner previously described.

After preheating, a first printing pass may be performed, during which the electronic agent 30 is selectively applied on portion(s) 60 of the build material 16 that are to become conductive region(s) 52 in the fused layer 56'. The electronic agent 30 may be dispensed using the applicator 28A, and may be dispensed at a maximum loading (e.g., 255 contone). The first printing pass may involve the application of the electronic agent 30 alone, or the application of the electronic agent 30 in portion 60 and the detailing agent 34 in portion(s) 62 or 62 and 64.

The detailing agent 34 may be selectively applied using any suitable applicator, such as applicator 28C.

The detailing agent 34 may be water alone. The detailing agent 34 may also include a surfactant, a co-solvent, and a balance of water. In some examples, the detailing agent 34 consists of these components, and no other components. In some instances, the detailing agent 36 further includes an anti-kogation agent, a biocide, or combinations thereof. The components of the detailing agent 34 may be similar to the surfactants, co-solvents, anti-kogation agents, and biocide described above in reference to the electronic agent 30 and/or fusing agent 32. The detailing agent 34 may also include a colorant, but it is to be understood that this colorant may absorb the radiation used for heating and fusing, but to a lesser extent than the colorant in the fusing agent 32. Overall, the heating effect of the colorant in the detailing agent 34 is much less than the cooling effect produced by other components of the detailing agent 34. The colorant may be desirable when the detailing agent 34 is applied to the portion 62 (which ultimately also has the fusing agent 32 applied thereto as well).

When used in the first printing pass, the detailing agent 34 may be applied to actively cool portion(s) 62, 64 of the build material 16 that do not have the electronic agent 30 applied thereto. The detailing agent 34 may also be applied to actively cool portion(s) 60 that have the electronic agent 30 applied thereto. The detailing agent 34 may provide an evaporative cooling effect that reduces the temperature of the build material 16 in contact with the detailing agent 34 during the heating event(s) associated with the first printing pass. In the first printing pass, the amount of the detailing agent 34 applied in the portion 62 and the portion 64 may be the same. The use of the detailing agent 34 in this manner may eliminate the need for passive cooling, because the build material 16 exposed to the detailing agent 34 is maintained at or below the threshold temperature during the subsequent heating event(s). Alternatively, passive cooling may also be used in order to ensure that the build material 16 exposed to the detailing agent 34 is at or below the threshold temperature before the method proceeds with another printing pass. The time period for passive cooling after the first pass and heating event(s) may be shorter when the detailing agent 34 is utilized (compared to when it is not utilized).

The first printing pass may be associated with one heating event. For example, immediately before, during, or immediately after the electronic agent 30 is dispensed or the electronic agent 30 and the detailing agent 34 are dispensed, the build material 16, which may have the agent(s) 30 or 30, 34 thereon, may be exposed to a heating event using radiation source 46, 46'.

One or more additional printing passes, during which the electronic agent 30 is selectively dispensed or the electronic agent 30 and the detailing agent 34 are selectively dispensed, may then be performed, and each of these additional printing passes may be combined with one or two heating events.

The plurality of printing passes are used to increase the amount of electronic agent 30 (and thus in some instances the amount of the conductive nanomaterials 31) that is applied to a single layer of build material 16, and in some instances, to apply the detailing agent 34 for thermal management of the portion(s) 60, 62, 64 of the build material 16. The plurality of heating events are used to counteract a cooling effect that may be brought on by the large amount of electronic agent 30 that is applied, to evaporate liquid from the applied electronic agent 30, to heat the build material 16 or maintain the temperature of the build material 16 without fusing/curing the build material 16 (because the fusing agent 32 has not yet been dispensed), and/or to begin to sinter the nanomaterials 31 to form a conductive matrix 31'.

If the detailing agent 34 is not used in the subsequent pass(es) or the build material 16 temperature is above the threshold temperature after the heating event(s), it is to be understood that the build material 16 may be allowed to passively cool to or below the threshold temperature prior to the next printing pass. The timing for passive cooling may be different following different heating passes, depending, in part upon the temperature of the build material 16, which can depend upon the amount of electronic agent 30 and/or detailing agent 34 applied in any given pass. Moreover, in this example of the method, more than one threshold temperature may be used to determine the timing of the next pass. For example, different portions 60, 62, 64 may have different threshold temperatures.

Figure 3C:
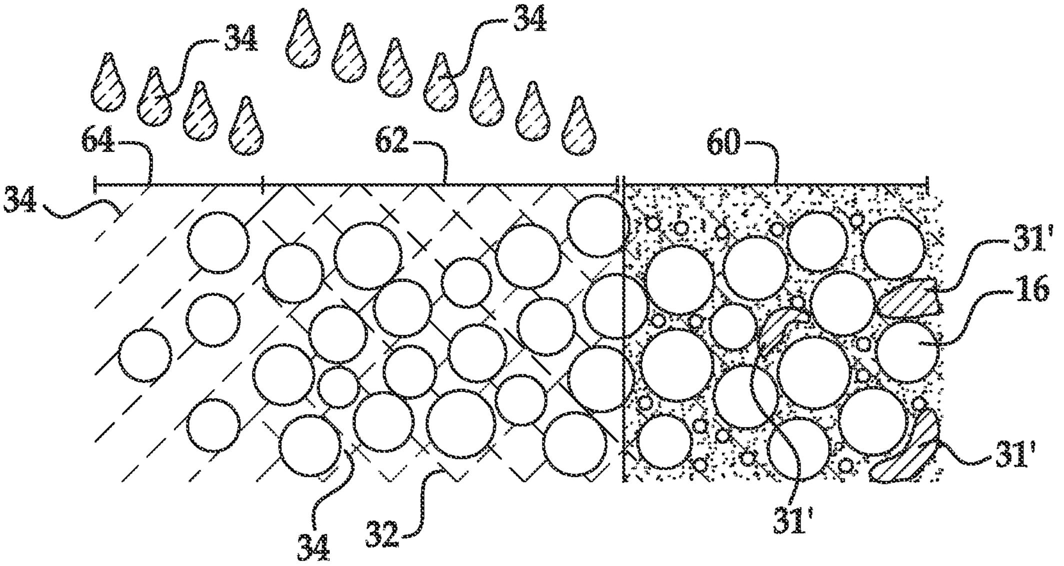

During a final printing pass of this example method, the electronic agent 30 is dispensed into the portion 60 (as shown in FIG. 3A); the fusing agent 32 is dispensed on the portion 60 with the electronic agent 30 and on another portion 62 (as shown in FIG. 3B); and the detailing agent 34 is dispensed on the portion 62 and, in some instances, on the portion 64 (as shown in FIG. 3C).

In this example, the electronic agent 30 and some of the fusing agent 32 are dispensed onto the same portion 60, which has already been exposed to electronic agent 30 and heating events. The portion 60 will form a conductive region 52 of the fused layer 56'. Both the electronic agent 30 and the fusing agent 32 are capable of penetrating into the spaces between the build material particles 16 in portion 60, as shown in FIG. 3B. Moreover, it is to be understood that some of the conductive nanomaterials 31 from the previously dispensed electronic agent 30 may already be sintered when the final printing pass takes place, and that the freshly applied electronic agent 30 and the fusing agent 32 are capable of penetrating into the spaces between the build material particles 16 and the conductive matrix 31' that has formed (see FIG. 3B).

In this example, some of the fusing agent 32 is also dispensed onto the portion 62, which is not exposed to any electronic agent 30 and may have been exposed to detailing agent 34 in prior passes. The portion 62 will form a non-conductive or insulating region 54 of the fused layer 56'. The fusing agent 32 is capable of penetrating into the spaces between the build material particles 16 in portion 62, as shown in FIG. 3B. It is to be understood that an electronic agent 30 including an insulating material could also be applied to the portion 62 to form the insulating region 54.

In this example, some of the fusing agent 32 and the detailing agent 34 are dispensed onto the same portion 62. As noted above, the portion 62 will form a non-conductive or insulating region 54 of the fused layer 56'. The amount of fusing agent 32 that is dispensed is enough to absorb a desirable amount of radiation from the subsequently applied electromagnetic radiation, and the amount of detailing agent 34 that is dispensed is enough to keep the build material 16 in the portion 62 from over-heating without preventing fusing. When used in portion 62, it may be desirable for the detailing agent 34 to contain a colorant that matches the color of the fusing agent 32, but does not absorb the applied electromagnetic radiation or does not absorb enough of the applied electromagnetic radiation to initiate fusing.

Both the fusing agent 32 and the detailing agent 34 are capable of penetrating into the spaces between the build material particles 16 in portion 62, as shown in FIG. 3C.

Also as shown in FIG. 3C, the detailing agent 34 may be dispensed onto the portion 64. Portion 64 does not have any fusing agent 32 applied thereto, and thus will not fuse during the final heating event(s) and will not be part of the final fused layer 56'. As an example, the portion(s) 64 may be outside of an edge boundary (i.e., the outermost portions where the fusing agent 32 is selectively deposited onto the build material 16 during 3D printing) of the fused layer 56'. The selective application of the detailing agent 34 in these portion(s) 64 can prevent the build material 16 in these area(s) from fusing and can also prevent thermal bleed (i.e., heat transferring from the portion 62 which is fused).

The amount of detailing agent applied in portion 62 and in portion 64 depends on the thermal situation in each portion 62, 64. In these portions 62, 64, the thermal situation may vary depending on the build material 16, the fusing agent 32, and/or the heating event conditions.

Figure 3D:
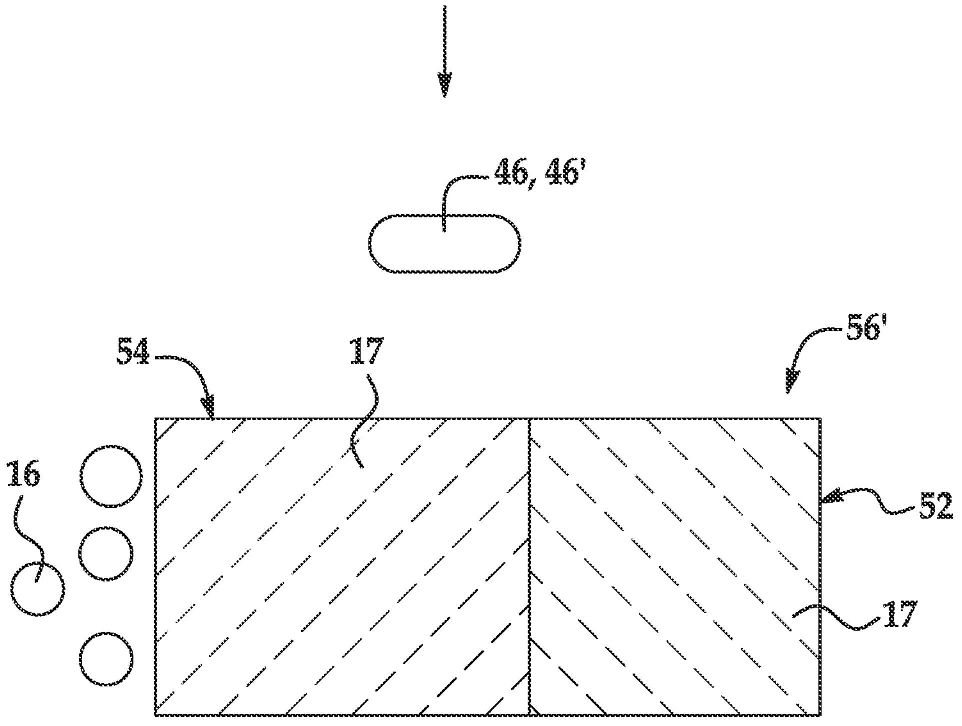

Before, during, or after the final pass in which the electronic agent 30, the fusing agent 32, and the detailing agent 34 are dispensed, all of the build material 16 can be exposed to a final heating event, as shown in FIG. 3D. During this heating event, the fusing agent 32 facilitates fusing of the build material particles 16 in contact therewith (i.e., in portions 60 and 62) by absorbing energy from the electromagnetic radiation and converting the energy to heat. This raises the temperature of the build material 16 (in contact with the fusing agent 32) above the melting or softening point of the build material 16. As such, the build material 16 fuses together to form a matrix of fused build material 17. The fused build material 17 at the portion 62 forms the insulating region 54 of the fused layer 56'. At portion 60, the conductive nanomaterials 31 in the electronic ink 30 can form additional conductive matrices 31' that becomes interlocked with the fused build material 17. The combination of the fused build material 17 and the conductive matrices 31' forms the conductive region 52 of the fused layer 56'.

In the example shown in FIG. 3D, some of the build material 16 (at portion 64) remains unfused. This build material 16 may be removed from the fused layer 56', and in some instances may be washed and reused in another 3D printing process.

It is to be understood that the various passes and heating events described in reference to FIGS. 3A through 3D are performed on a single layer 58 of the build material 16 (i.e., prior to the application of additional build material 16). After the fused layer 56' is formed, a new layer of build material 16 may be applied to the fused layer 56' and the various passes and heating events may be repeated to form another fused layer on the fused layer 56'. These processes may be repeated as many times is desirable to form the final 3D part 50.

In the example shown in FIGS. 3A through 3D, the conductive region 52 could be fused prior to the last printing pass and heating event(s). This may be accomplished by dispensing the fusing agent 32 on the portion 60 during an earlier printing pass. In these instances, the detailing agent 34 may be used in the portion 60 during subsequent printing passes in order to keep the portion 60 from over fusing (e.g., when the fusing agent 32 is highly absorbing and subsequent heating events are performed). Also in these instances, subsequent printing passes may be performed without heating events until the final printing pass when it is desirable to fuse other portions, such as portion 62.

Still another example of the method is shown in FIGS. 3E, 3A, 3F and 3G. This example is similar to the example described in reference to FIGS. 3A through 3D, except that the activating agent 36 is applied prior to any application of the electronic agent 30. While this example utilizes the activating agent 36, it is to be understood that the use of the activating agent 36 depends, in part, upon the electronic agent 30 that is used. Activating agent 36 may not be utilized when the material 31 does not have a passivated surface, when localized heating is used in combination with a higher melting point build material 16, or when the electronic agent 30 does not require a physical or chemical transformation to achieve the desired electronic properties (e.g., when the electronic agent 30 includes PEDOT:PSS as the conductive material 31).

In this example, the activating agent 36 is selectively applied to the portion 60 of the build material layer 58 in a plurality of passes and before the electronic agent 30, the electronic agent 30 is selectively applied to the portion 60 in a plurality of passes, the fusing agent 32 is selectively applied to the portion 60 and to another portion 62 in a single pass, the detailing agent 34 is applied to at least the portion 62 in a single pass or a plurality of passes, and several heating events are performed throughout the passes. The order of the passes and heating events is controlled in order to control the mechanical property and the conductive property of the fused layer 56" that is formed. It is to be understood that FIGS. 3E and 3A together depict an example of the first printing pass, FIGS. 3E, 3A and 3F together depict an example of the final printing pass, and FIG. 3G depicts an example of the final heating event to form the fused layer 56".

To control the conductive or semi-conductive property, the activating agent 36 and the electronic agent 30 are applied at a maximum loading in several printing passes (2 or more), and the fusing agent 32 is applied during the final printing pass alone (so that radiation absorption does not occur during each heating event when the active material is highly absorbing). In other examples to control the conductive or semi-conductive property, an applicator 28A may be selected that dispenses high enough drop weights of the electronic agent 30 to achieve the desired conductivity without utilizing maximum loadings. To control the mechanical property, a suitable number of heating events are utilized, but the heating events are spread out throughout the printing passes to avoid over-heating and to manage thermal distribution. Also to control the mechanical property, the detailing agent 34 is utilized for thermal management.

Figure 3E:
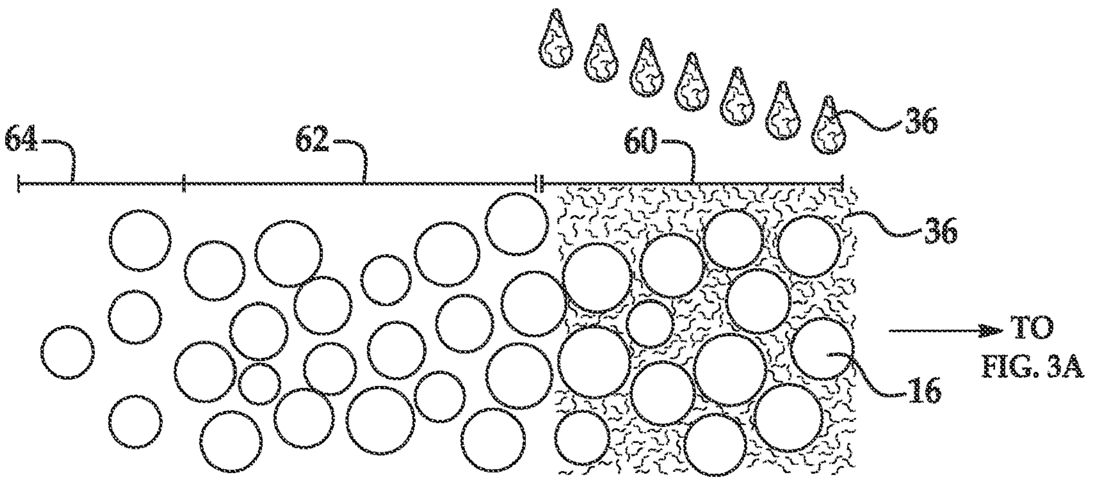

As shown in FIG. 3E, this example method involves applying the build material 16. The build material 16 may be applied to form a layer 58 as previously described.

As an example of this method, one or two heating events may be performed prior to the selective application of any of the agents 30, 32, 34, 36. This heating event(s) may be performed to preheat the build material 16 in the manner previously described.

After preheating, a first printing pass may be performed, during which at least the activating agent 36 is selectively applied on portion(s) 60 of the build material 16 that are to become conductive region(s) 52 in the fused layer 56". The first printing pass may involve the application of the activating agent 36 alone, the application of both the activating agent 36 and the electronic agent 30, or the application of the activating agent 36 and the electronic agent 30 in portion 60 and the detailing agent 34 in portion(s) 62 or 62 and 64, or 60, 62 and 64.

After the build material 16 is applied, the activating agent 36 is selectively applied to the portion 60 where the electronic agent 30 will be applied, as shown in FIG. 3E. The activating agent 36 may be selectively applied using any suitable applicator, such as applicator 28D.

The activating agent 36 is a pretreat composition that may be used when the electronic ink 30 includes the dispersing agent at the surfaces of the conductive nanomaterials 31 (or other conductive, semi-conductive, and/or insulating material). The activating agent 36 includes a metal salt that can react with dispersing agent to remove the dispersing agent from the nanomaterials 31. The removal of the dispersing agent can increase the sintering between the conductive nanomaterials 31 and improve the conductivity of the matrix 31' formed of the sintered nanomaterials. As such, the metal salt may be said to activate the nanomaterials 31.

Examples of the metal salt that may be used in the activating agent 36 include chloride salts, bromide salts, and iodide salts. The chloride, bromide, or iodide salts may be an alkali metal salt or an alkaline earth metal salt. Some specific examples include potassium chloride, sodium chloride, lithium chloride, calcium chloride, hydrochloride salt, magnesium chloride, manganese chloride, zinc chloride, nickel chloride, cobalt chloride, iron chloride, potassium bromide, sodium bromide, lithium bromide, potassium iodide, sodium iodide, lithium iodide, and combinations thereof.

The activating agent 36 may be an aqueous solution that includes at least the metal salt. In an example, the activating agent 36 may consist of water and the metal salt. In another example, the activating agent 36 may include other components in addition to the water and the metal salt. For example, the activating agent 36 may include any one or more of the surfactants, co-solvents, anti-kogation agents, and biocides described above in reference to the electronic agent 30 and/or fusing agent 32.

The metal salt can be present in the activating agent 36 at a concentration that is effective to remove the dispersing agent from the nanomaterials 31 in the electronic ink and to aid in forming conductive region(s) 52 using the electronic agent 30. In one example, the concentration of metal salt in the activating agent 36 may range from about 0.1 wt % to about 15 wt % (based on the total wt % of the agent 36). In another example, the metal salt concentration may range from about 0.5 wt % to about 10 wt %. In yet another example, the metal salt concentration may range from about 1 wt % to about 5 wt %.

While FIG. 3E illustrates the application of the activating agent 36 during the 3D printing method, it is to be understood that the activating agent 36 could be dispensed onto the build material 16 prior to being used in the 3D printing system 10. As such, the activating agent 36 could be used to pretreat the build material 16.

After the activating agent 36 is applied to the portion 60 of the build material 16 (either during printing or to pretreat the build material 16), a heating event may be performed. This heating event may be used to dry the activating agent 36 before the electronic agent 30 is applied. This heating event may be active, in that the radiation source 46, 46' is passed over the build material platform 12 or turned on. When the build material platform 12 is preheated to an elevated temperature that can dry the liquid from the activating agent 36, the heating event may not be performed prior to the application of the electronic agent 30.

The method then moves to FIG. 3A, which illustrates the selective application of the electronic agent 30 onto the portion 60. In this example, when the electronic agent 30 is applied on the portion 60, the nanomaterials 31 can come into contact with the previously applied metal salt, which can remove the dispersing agent from the nanomaterials 31 and render them more suitable for sintering.

When the activating agent 36 is alone applied in the first pass (which is associated with a heating event), the second pass may involve the application of the electronic agent 30 in the portion 60, with or without the application of the detailing agent 34 to actively cool portion(s) 62, 64 of the build material 16 that do not have the electronic agent 30 applied thereto. In this example, the second pass may be associated with one or two heating events.

When the activating agent 36 and electronic agent 30 are applied together in the first pass, the detailing agent 34 may also be applied (during the first pass) to actively cool portion(s) 62, 64 of the build material 16 that do not have the electronic agent 30 applied thereto. In this example, the first pass may be associated with one or two heating events.

In these examples, the detailing agent 34 may also be used in the portion 60 to keep the portion having the electronic agent 30 thereon from overheating.

When used in the first or second printing pass, the detailing agent 34 may provide an evaporative cooling effect that reduces the temperature of the build material 16 in contact with the detailing agent 34 during the heating event(s) taking place in conjunction with the first printing pass or the second printing pass. The use of the detailing agent 34 may eliminate the need for passive cooling, because the build material 16 exposed to the detailing agent 34 is maintained at or below the threshold temperature during the subsequent heating event(s). Alternatively, passive cooling may also be used in order to ensure that the build material 16 exposed to the detailing agent 34 is at or below the threshold temperature before the method proceeds with another printing pass.

One or more additional printing passes, during which the activating agent 36 and the electronic agent 30 are selectively dispensed or the activating agent 36, electronic agent 30 and the detailing agent 34 are selectively dispensed, may then be performed, and each of these additional printing passes may be associated with one or two heating events. With any of these additional printing passes, a heating event may follow the application of the activating agent 36 in order to dry the agent 36.

The plurality of printing passes are used to increase the amount of activating agent 36 and electronic agent 30 (and thus the amount of the conductive nanomaterials 31) that is applied to a single layer of build material 16, and in some instances, to apply the detailing agent 34 for thermal management of the portion(s) 62, 64 of the build material 16. The plurality of heating events are used to evaporate liquid from the applied activating agent 36, to counteract a cooling effect that may be brought on by the large amount of electronic agent 30 that is applied, to evaporate liquid from the applied electronic agent 30, to heat the build material 16 or maintain the temperature of the build material 16 without fusing/curing the build material 16 (because the fusing agent 32 has not yet been dispensed), and/or to begin to sinter the nanomaterials 31 to form a conductive matrix 31'.

If the detailing agent 34 is not used in the subsequent pass(es) or the build material 16 temperature is above the threshold temperature after the heating event(s), it is to be understood that the build material 16 may be allowed to passively cool to or below the threshold temperature prior to the next printing pass.

Figure 3F:
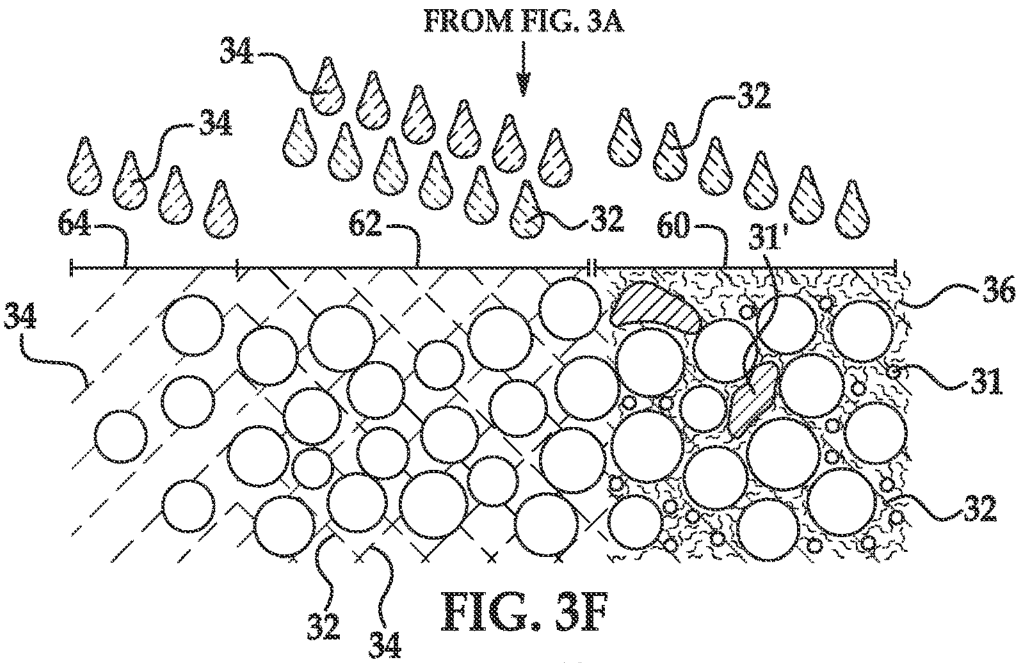
Figure 3G:
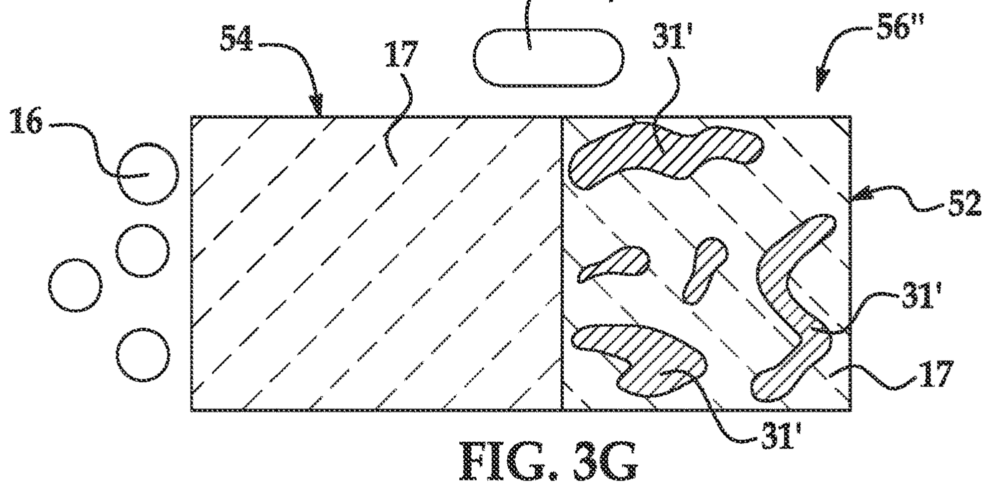

During a final printing pass of this example method, the activating agent 36 and electronic agent 30 are dispensed into the portion 60 (as shown in FIGS. 3E and 3A); the fusing agent 32 is dispensed on the portion 60 with the activating agent 36 and the electronic agent 30 and on another portion 62 (as shown in FIG. 3F); and the detailing agent 34 is dispensed on the portion 62 and, in some instances, on the portion 64 (as shown in FIG. 3F).

In this example, the activating agent 36, the electronic agent 30 and some of the fusing agent 32 are dispensed onto the same portion 60, which has already been exposed to activating agent 36, electronic agent 30, and heating events. The portion 60 will form a conductive region 52 of the fused layer 56". The agents 36, 30, 32 are capable of penetrating into the spaces between the build material particles 16 in portion 60, as shown in FIG. 3F. Moreover, it is to be understood that some of the conductive nanomaterials 31 from the previously dispensed electronic agent 30 may already be sintered when the final printing pass takes place, and that the freshly applied activating agent 36, electronic agent 30 and fusing agent 32 are capable of penetrating into the spaces between the build material particles 16 and the conductive matrix 31' that has formed (see FIG. 3F).

In this example, some of the fusing agent 32 is also dispensed onto the portion 62, which is not exposed to any activating agent 36 and electronic agent 30 and may have been exposed to detailing agent 34 in prior passes. The portion 62 will form a non-conductive or insulating region 54 of the fused layer 56". The fusing agent 32 is capable of penetrating into the spaces between the build material particles 16 in portion 62, as shown in FIG. 3F.

In this example, some of the fusing agent 32 and the detailing agent 34 are dispensed onto the same portion 62. As noted above, the portion 62 will form a non-conductive or insulating region 54 of the fused layer 56". The amount of fusing agent 32 that is dispensed is enough to absorb a desirable amount of radiation from the subsequently applied electromagnetic radiation, and the amount of detailing agent 34 that is dispensed is enough to keep the build material 16 in the portion 62 from over-heating without preventing fusing. When used in portion 62, it may be desirable for the detailing agent 34 to contain a colorant that matches the color of the fusing agent 32, but does not absorb the applied electromagnetic radiation or does not absorb enough of the applied electromagnetic radiation to initiate fusing.

Both the fusing agent 32 and the detailing agent 34 are capable of penetrating into the spaces between the build material particles 16 in portion 62, as shown in FIG. 3F.

Also as shown in FIG. 3F, the detailing agent 34 may be dispensed onto the portion 64. Portion 64 does not have any fusing agent 32 applied thereto, and thus will not fuse during the final heating event(s) and will not be part of the final fused layer 56'. As an example, the portion(s) 64 may be outside of an edge boundary of the fused layer 56". The selective application of the detailing agent 34 in these portion(s) 64 can prevent the build material 16 in these area(s) from fusing and can also prevent thermal bleed (i.e., heat transferring from the portion 62 which is fused).

Before, during, or after the final pass in which the activating agent 36, the electronic agent 30, the fusing agent 32, and the detailing agent 34 are dispensed, all of the build material 16 can be exposed to a final heating event, as shown in FIG. 3G. During this heating event, the fusing agent 32 facilitates fusing of the build material particles 16 in contact therewith (i.e., in portions 60 and 62) by absorbing energy from the electromagnetic radiation and converting the energy to heat. This raises the temperature of the build material 16 (in contact with the fusing agent 32) above the melting or softening point of the build material 16. As such, the build material 16 fuses together to form a matrix of fused build material 17. The fused build material 17 at the portion 62 forms the insulating region 54 of the fused layer 56". At portion 60, the conductive nanomaterials 31 in the electronic ink 30 can form additional conductive matrices 31' that becomes interlocked with the fused build material 17. The combination of the fused build material 17 and the conductive matrices 31' forms the conductive region 52 of the fused layer 56".

In the example shown in FIG. 3G, some of the build material 16 (at portion 64) remains unfused. This build material 16 may be removed from the fused layer 56', and in some instances may be washed and reused in another 3D printing process.

It is to be understood that the various passes and heating events described in reference to FIGS. 3E, 3A, 3F, and 3G are performed on a single layer 58 of the build material 16 (i.e., prior to the application of additional build material 16). After the fused layer 56" is formed, a new layer of build material 16 may be applied to the fused layer 56" and the various passes and heating events may be repeated to form another fused layer on the fused layer 56". These processes may be repeated as many times is desirable to form the final 3D part 50.

The examples shown in FIGS. 2 and 3 discuss dispensing the fusing agent 32 in the final printing pass in order to avoid over-fusing. However, when the fusing agent 32 includes an active material that is less absorbing (i.e., does not absorb enough radiation in a single heating event to reach the melting temperature of the build material 16), then the fusing agent 32 could be applied in one or more of the other printing passes. In these instances, the fusing agent 32 could be applied before or with the electronic agent 30. Also in these instances, the number and conditions of the heating events may be selected so that the portion(s) 60, 62 in contact with the fusing agent 32 will fuse upon completion of the method. Still further in these instances, passive and active cooling (e.g., detailing agent 34) may not be used, in part because the fusing agent 32 fuses the portion(s) 60, 62 over the course of the method without absorbing too much radiation.

Still another example of the method is shown in FIGS. 4A through 4D. This example is similar to the example described in reference to FIGS. 3E, 3A, 3F and 3G, except that the electronic/fusing agent 30' also functions as a fusing agent. As such, this example of the electronic/fusing agent 30' includes any of the previously described radiation absorbing binding agents (i.e., active materials).

In this example, the activating agent 36 may be selectively applied to the portion 70 of the build material layer 58 in a plurality of passes and before the electronic agent 30, the electronic/fusing agent 30' is selectively applied to the portion 70 in a plurality of passes, the fusing agent 32 is selectively applied to another portion 72 in a single pass or a plurality of passes, the detailing agent 34 is applied to at least the portion 72 in a single pass or a plurality of passes, and several heating events are performed throughout the passes. The order of the passes and heating events is controlled in order to control the mechanical property and the conductive property of the fused layer 56'" that is formed. It is to be understood that FIGS. 4A through 4D depict an example of the final printing pass and final heating event to form the fused layer 56'".

To control the conductive property, the activating agent 36 and the electronic/fusing agent 30' may be applied in several printing passes (2 or more), the electronic/fusing agent 30' may be applied at relatively low loadings so as to not absorb too much radiation and thus over fuse the build material 16 throughout the process, and the heating events may be relatively quick so as to not over fuse the build material 16 in contact with the electronic/fusing agent 30' throughout the process. To control the mechanical property, a suitable number of heating events are utilized, but the heating events are spread out throughout the printing passes to avoid over-heating and to manage thermal distribution. Also to control the mechanical property, the detailing agent 34 is utilized for thermal management.

Figure 4A:
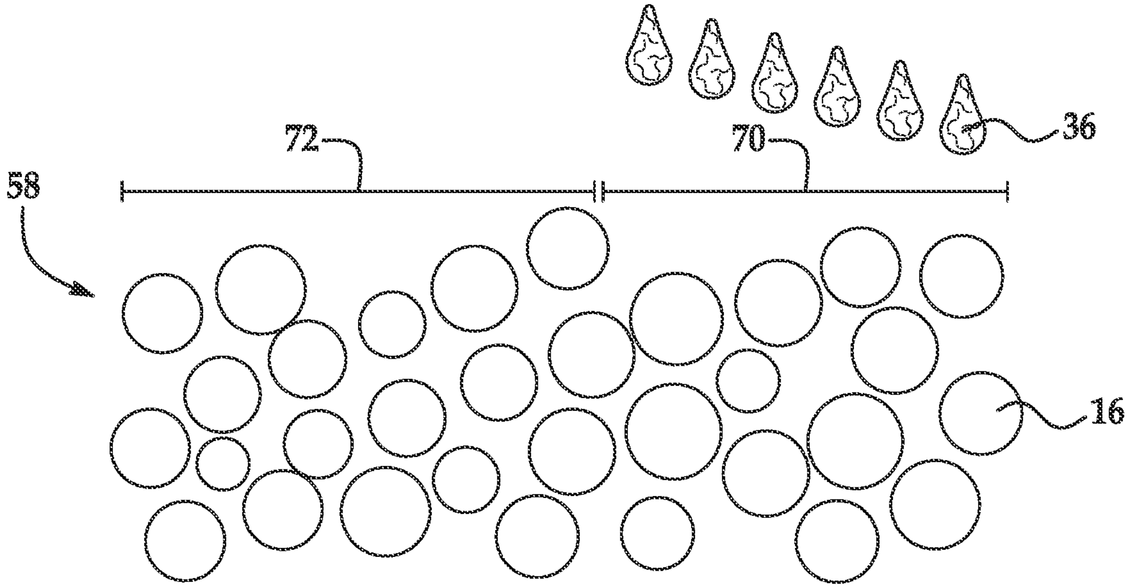
FIGS. 4A through 4D are schematic views depicting yet another example of a method for forming a 3D printed electronic part, where the method utilizes an activating agent, an electronic agent, a fusing agent, and a detailing agent.

As shown in FIG. 4A, this example method involves applying the build material 16. The build material 16 may be applied to form a layer 58 as previously described.

As an example of this method, one or two heating events may be performed prior to the selective application of any of the agents 30', 32, 34, 36. This heating event(s) may be performed to preheat the build material 16 in the manner previously described.

After preheating, a first printing pass may be performed, during which at least the activating agent 36 is selectively applied on portion(s) 70 of the build material 16 that are to become conductive region(s) 52 in the fused layer 56'". The first printing pass may involve the application of the activating agent 36 alone, the application of both the activating agent 36 and the electronic agent 30', or the application of the activating agent 36 and the electronic agent 30' in portion 70 and the detailing agent 34 in portion(s) 72.

After the activating agent 36 is applied to the portion 70 of the build material 16 (either during printing or to pretreat the build material 16), a heating event may be performed. This heating event may be used to dry the activating agent 36 before the electronic agent 30' is applied. This heating event may be active, in that the radiation source 46, 46' is passed over the build material platform 12 or turned on. When the build material platform 12 is preheated to an elevated temperature that can dry the liquid from the activating agent 36, the heating event may not be performed prior to the application of the electronic agent 30.

The electronic/fusing agent 30' may then be dispensed onto the portion 70. In this example, when the electronic/fusing agent 30' is applied on the portion 70, the nanomaterials 31 can come into contact with the previously applied metal salt, which can remove the dispersing agent from the nanomaterials 31 and render them more suitable for sintering.

When the activating agent 36 is alone applied in the first pass (which is associated with a heating event), the second pass may involve the application of the electronic/fusing agent 30' in the portion 70, with or without the application of the detailing agent 34 to actively cool portion(s) 72 of the build material 16 that do not have the electronic/fusing agent 30' applied thereto. In this example, the second pass may be associated with one or two heating events.

When the activating agent 36 and electronic/fusing agent 30' are applied together in the first pass, the detailing agent 34 may also be applied (during the first pass) to actively cool portion(s) 72 of the build material 16 that do not have the electronic/fusing agent 30' applied thereto. In this example, the first pass may be associated with one or two heating events.

When used in the first or second printing pass, the detailing agent 34 may provide an evaporative cooling effect that reduces the temperature of the build material 16 in contact with the detailing agent 34 during the heating event(s) following the first printing pass or the second printing pass. The use of the detailing agent 34 may eliminate the need for passive cooling, because the build material 16 exposed to the detailing agent 34 is maintained at or below the threshold temperature during the subsequent heating event(s). Alternatively, passive cooling may also be used in order to ensure that the build material 16 exposed to the detailing agent 34 is at or below the threshold temperature before the method proceeds with another printing pass.

Moreover, since the electronic/fusing agent 30' includes a radiation absorber, the heating events that take place prior to the final heating event (e.g., during heating events associated with the first printing pass, second printing pass, etc.) should not completely fuse the build material 16 in contact with the electronic/fusing agent 30'. This may be accomplished by shortening the heating events that take place prior to the final heating event, or applying lower loadings of the electronic agent 30' in each of the printing passes, or by applying the detailing agent 34 in the portion 70. The total loading of the electronic/fusing agent 30' applied throughout the method will be suitable to form the conductive region 52, however, the individual loading applied during each pass will not allow the build material 16 in portion 70 to fully fuse until the final heating event is performed.

One or more additional printing passes, during which the activating agent 36 and the electronic/fusing agent 30' are selectively dispensed or the activating agent 36, electronic/fusing agent 30' and the detailing agent 34 are selectively dispensed, may then be performed, and each of these additional printing passes may be associated with one or two heating events. With any of these additional printing passes, a heating event may follow the application of the activating agent 36 in order to dry the agent 36.

The plurality of printing passes are used to increase the amount of activating agent 36 and electronic/fusing agent 30' (and thus the amount of the conductive nanomaterials 31 as well as active material) that is applied to a single layer of build material 16, and in some instances, to apply the detailing agent 34 for thermal management of the portion(s) 70, 72 of the build material 16. The plurality of heating events are used to evaporate liquid from the applied activating agent 36, to evaporate liquid from the applied electronic/fusing agent 30', to heat the build material 16 or maintain the temperature of the build material 16 in the region 72 without fusing/curing the build material 16 (because the fusing agent 32 has not yet been dispensed), and/or to begin to fuse the build material 16 in contact with the electronic agent/fusing 30' and to sinter the nanomaterials 31 to form a conductive matrix 31'.

If the detailing agent 34 is not used in the subsequent pass(es) or the build material 16 temperature is above the threshold temperature after the heating event(s), it is to be understood that the build material 16 may be allowed to passively cool to or below the threshold temperature prior to the next printing pass.

Figure 4B:
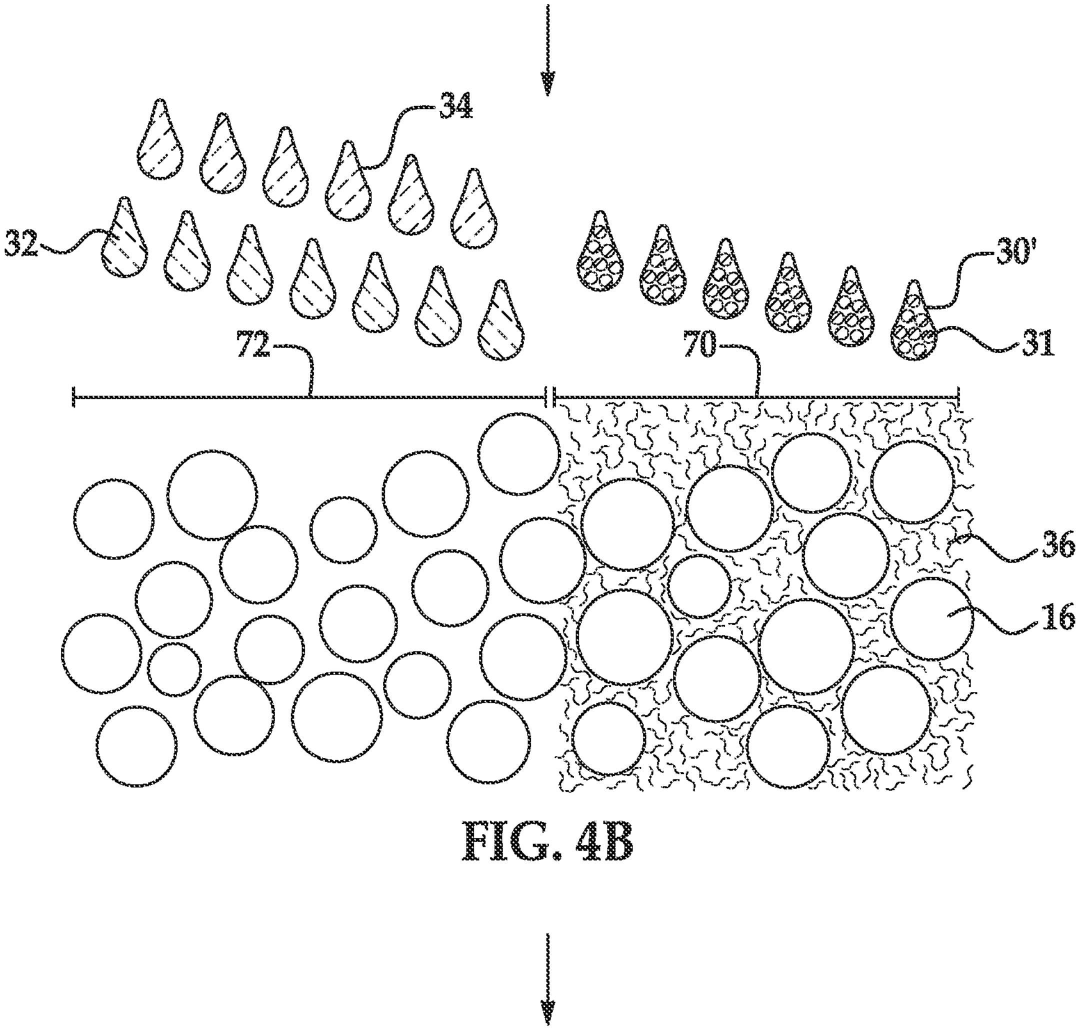
Figure 4C:
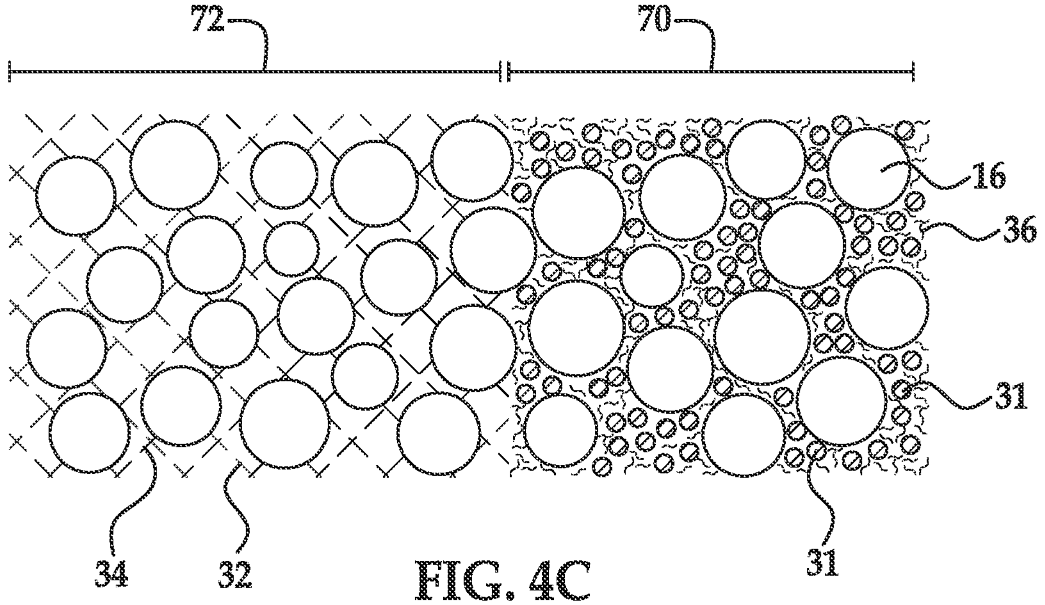

During a final printing pass of this example method, the activating agent 36 and electronic/fusing agent 30' are dispensed into the portion 70 (as shown in FIGS. 4A-4C); the fusing agent 32 is dispensed on the portion 72 (as shown in FIGS. 4B-4C); and the detailing agent 34 is dispensed on the portion 72 (as shown in FIGS. 4B-4C).

In this example, the activating agent 36 and the electronic/fusing agent 30' are dispensed onto the same portion 70, which has already been exposed to activating agent 36, electronic/fusing agent 30', and heating events. The portion 70 will form a conductive region 52 of the fused layer 56'''. The agents 36, 30' are capable of penetrating into the spaces between the build material particles 16 in portion 70, as shown in FIG. 4C. Moreover, while not shown, it is to be understood that some of the conductive nanomaterials 31 from the previously dispensed electronic agent 30' may already be sintered and some of the build material 16 in contact with the previously dispensed electronic agent 30' may already be fused when the final printing pass takes place. In this instance, the freshly applied activating agent 36 and electronic agent 30' are capable of penetrating into the spaces between any remaining unfused build material particles 16 and the conductive matrix 31' that has formed.

In this example, the fusing agent 32 and the detailing agent 34 are dispensed onto the same portion 72. The portion 72 will form a non-conductive or insulating region 54 of the fused layer 56'''. The amount of fusing agent 32 that is dispensed is enough to absorb a desirable amount of radiation from the subsequently applied electromagnetic radiation, and the amount of detailing agent 34 that is dispensed is enough to keep the build material 16 in the portion 72 from over-heating without preventing fusing. When used in portion 72, it may be desirable for the detailing agent 34 to contain a colorant that matches the color of the fusing agent 32, but does not absorb the applied electromagnetic radiation.

Both the fusing agent 32 and the detailing agent 34 are capable of penetrating into the spaces between the build material particles 16 in portion 72, as shown in FIG. 4C.

While not shown, the detailing agent 34 may be dispensed onto other portions of the build material 16 that will not be part of the final fused layer 56'''. These portions do not have electronic agent 30' or fusing agent 32 thereon, and thus will not fuse. As an example, these portion(s) may be outside of an edge boundary of the fused layer 56'''. The selective application of the detailing agent 34 in these portion(s) can prevent the build material 16 in these area(s) from fusing and can also prevent thermal bleed (i.e., heat transferring from the portion 70 or 72 which is fused).

Figure 4D:
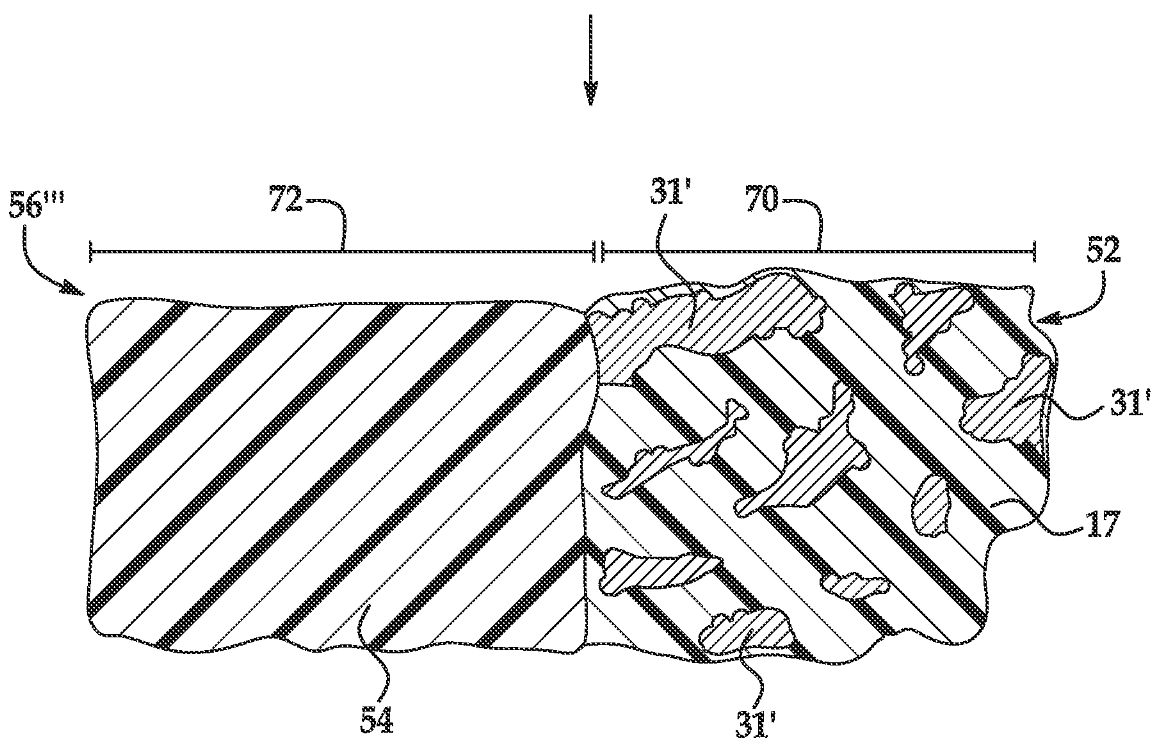

Before, during, or after the final pass in which the activating agent 36, the electronic/fusing agent 30', the fusing agent 32, and the detailing agent 34 are dispensed, all of the build material 16 can be exposed to a final heating event, as shown in FIG. 4D. During this heating event, the fusing agent 32 facilitates fusing of the build material particles 16 in contact therewith (i.e., in portion 72) and the electronic/fusing agent 30' facilitates fusing of the build material particles 16 in contact therewith (i.e., in portion 70) by absorbing energy from the electromagnetic radiation and converting the energy to heat. The temperature of the build material 16 (in contact with the fusing agent 32 or electronic/fusing agent 30') is raised above the melting or softening point of the build material 16. As such, the build material 16 fuses together to form a matrix of fused build material 17. The fused build material 17 at the portion 72 forms the insulating region 54 of the fused layer 56'''. At portion 70, the conductive nanomaterials 31 in the electronic/fusing agent 30' can form additional conductive matrices 31' that becomes interlocked with the fused build material 17. The combination of the fused build material 17 and the conductive matrices 31' forms the conductive region 52 of the fused layer 56'''.

It is to be understood that the various passes and heating events described in reference to FIGS. 4A through 4D are performed on a single layer 58 of the build material 16 (i.e., prior to the application of additional build material 16). After the fused layer 56''' is formed, a new layer of build material 16 may be applied to the fused layer 56''' and the various passes and heating events may be repeated to form another fused layer on the fused layer 56'''. These processes may be repeated as many times is desirable to form the final 3D part 50.

In any of the examples disclosed herein, the final part 50 may be exposed to a surface finishing technique, which involves six additional heating events. It has been found that by exposing the outermost layer of the final part 50 to six additional heating events, the surface finish of the final part 50 is aesthetically pleasing and the conductivity of the conductive region(s) 52 are not deleteriously affected. These heating events allow the build material 16 at the surface of the final part to flow to form a smooth surface. These heating events do not deleteriously affect the conductive region(s) (or other electronic region(s)) formed below or at the surface.

Also in any of the examples disclosed herein, the electronic agent 30 or the electronic/fusing agent 30' including the material 31 may be dispensed after the fused layer 56, 56', 56" is formed. This may be desirable to form a thin film, conductive, semi-conductive, or insulating electronic feature between fused layers 56, 56', 56".

Any of the examples disclosed herein may be used to form conductive region(s) 52 of 3D parts 50. The conductive region 52 can have sufficient electrical conductivity to form electrical components. The resistance of the conductive region 52 can be tuned in a variety of ways. For example, the resistance can be affected by when and how much of the active material (in the fusing agent 32 and/or the electronic agent 30') is dispensed, the number and placement of heating events throughout the process (so that the build material 16 is not overheated or over fused), the type of metal salt in the activating agent 36, the type of conductive material in the electronic ink 30, 30', the concentration of the conductive material in the electronic ink 30, 30', the amount of activating agent 36 dispensed, the amount of electronic ink 30, 30' dispensed, the cross section and length of the conductive region 52, etc. When the activating agent 36 and the electronic agent 30, 30' is are dispensed by ink jetting, the amount dispensed can be adjusted by changing print speed, drop weight, number of slots from which the agents are fired, and number of passes printed per build material layer 58. In certain examples, conductive region 52 may have a resistance ranging from about 1 ohm to about 5 Mega ohms.

As mentioned above, sufficient conductivity can be achieved by dispensing a sufficient amount of the conductive material (e.g., nanomaterial 31) onto the build material 16. In some examples, a sufficient mass of the conductive material per volume of the conductive region 52 can be used to achieve conductivity. For example, the mass of conductive material per volume of the conductive region 52 can be greater than 1 $mg/cm^3$, greater than 10 $mg/cm^3$, greater than 50 $mg/cm^3$, or greater than 100 $mg/cm^3$. In a particular example, the mass of conductive material per volume of the conductive region 52 can be greater than 140 $mg/cm^3$. In further examples, the mass of conductive material per volume of the conductive region 52 can be from 1 $mg/cm^3$ to 1000 $mg/cm^3$, from 10 $mg/cm^3$ to 1000 $mg/cm^3$, from 50 $mg/cm^3$ to 500 $mg/cm^3$, or from 100 $mg/cm^3$ to 500 $mg/cm^3$.

In the examples disclosed herein, the mechanical property may be such that the final layer or part exhibits at least 80% of the properties of the bulk material. As an example, parts may have a modulus of 1050 MPa.

Still further, the methods disclosed herein may be modified to create electronic components other than conductive electronic components. For example, an electronic agent 30 may be dispensed to create a resistive component. To control a resistive property, the electronic agent 30 including the conductive material 31 may be applied at a reduced loading, in a reduced number of printing passes, etc. For another example, an electronic agent 30 may be dispensed to create an insulating component. To control an insulating property, the electronic agent 30 may include an insulating material, and the dispensed loading and/or drop weight may be controlled to achieve the desirable insulation.

It is to be understood that while several examples of the method have been provided herein, the order of the multiple printing passes and multiple heating events may vary, depending, at least in part, upon the agents 30, 30', 32, 34, 36 being used. The thermal conditions of the various portions 60, 62, 64, 70, 72 may be different throughout the method (in part because of the different agents that are utilized), and thus different thermal cycles may be used throughout the method. The thermal cycles may be controlled by the amount of agent 30, 30', 32, 34, 36 utilized, when the agent(s) 30, 30', 32, 34, 36 are utilized, and when heating events are employed in relation to when certain agent(s) 30, 30', 32, 34, 36 are utilized. As described in the various examples, the order of printing passes and heating events may be varied in any suitable manner in order to achieve a particular mechanical strength of the part 50 and a particular conductivity of one or more regions 52 of the part 50.

Figure 6:
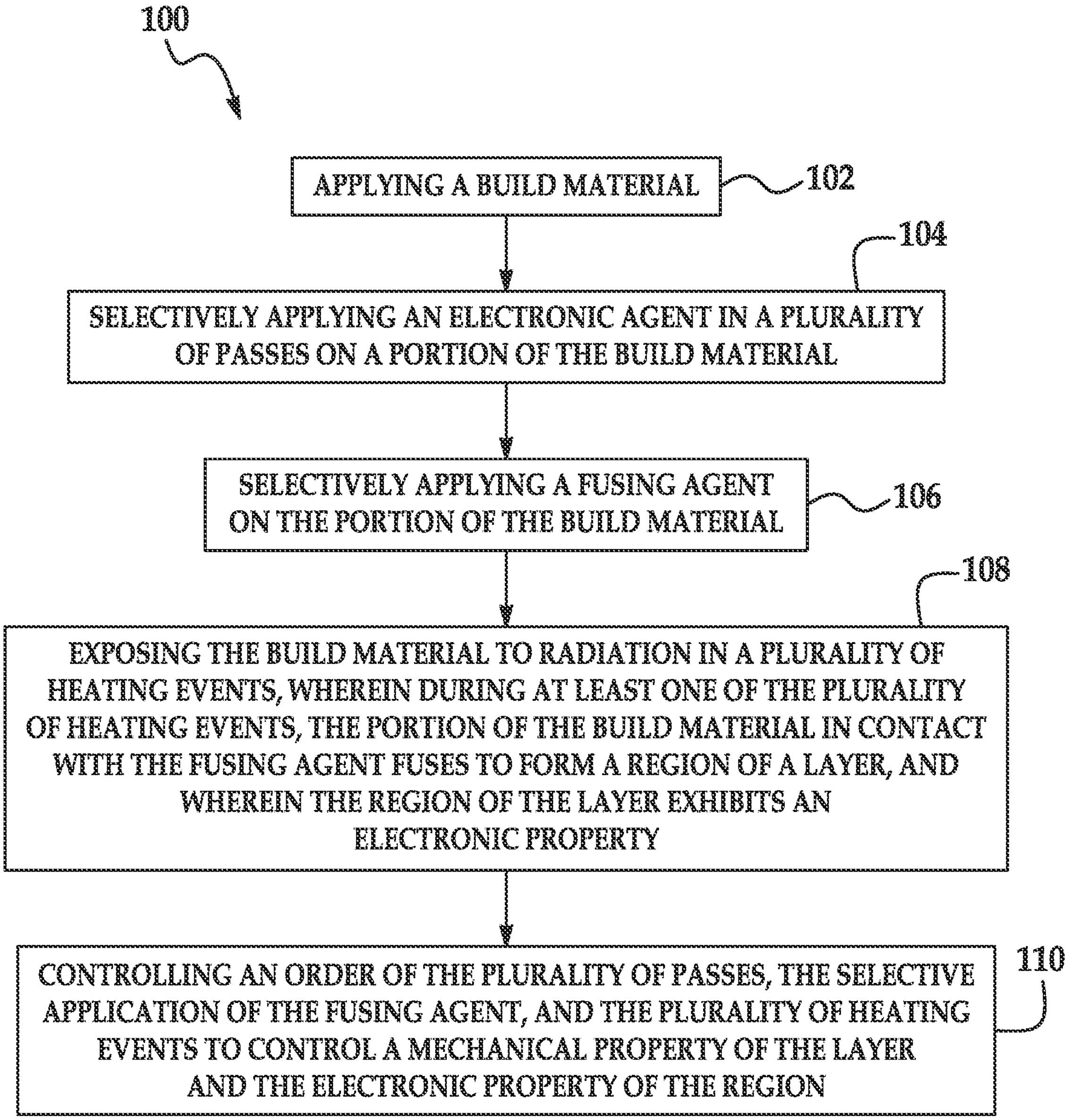
FIG. 6 is a flow diagram illustrating an example of a method for forming three-dimensional (3D) printed electronic parts.

An example of a method 100 for forming three-dimensional (3D) printed electronic parts is depicted in FIG. 6. It is to be understood that the example method shown in FIG. 6, variations thereof, etc. are discussed in detail above.

Method 100 includes applying a build material (at reference number 102), and selectively applying an electronic agent in a plurality of passes on a portion of the build material (at reference number 104). A fusing agent is selectively applied on the portion of the build material (at reference number 106). The method 100 further includes exposing the build material to radiation in a plurality of heating events, wherein during at least one of the plurality of heating events, the portion of the build material in contact with the fusing agent fuses to form a region of a layer, and wherein the region of the layer exhibits an electronic property (at reference number 108).

Method 100 further includes controlling an order of the plurality of passes, the selective application of the fusing agent, and the plurality of heating events to control a mechanical property of the layer and the electronic property of the region (at reference number 110).

To further illustrate the present disclosure, prophetic comparative examples and an example are given herein. It is to be understood that these examples are provided for illustrative purposes and are not to be construed as limiting the scope of the present disclosure.

EXAMPLES

Prophetic Comparative Example 1

A fused layer is prepared with several printing passes and heating events.

The materials include: polyamide 12 build material, a sodium chloride activating agent (AA), a silver nanoparticle electronic agent (EA), a carbon black fusing agent (FA), and water as a detailing agent (DA). The conductive regions are to be formed with the AA and the EA and the non-conductive regions are to be formed with the FA and DA.

The printing system includes 7 ink/fluid channels to dispense the agents, and leading and trailing lamps positioned on either end of the carriage that accommodates the channels. When printing from right to left, the leading lamp is exposed to the build material platform prior to the trailing lamp. After the 1$^{st}$ and 3$^{rd}$ printing passes and associated heating event(s), a controlled cooling step is performed. This involves the printing system waiting until a temperature of the build material surface cools down to or below a threshold temperature of 142° C. before proceeding with the next printing pass/heating event sequence.

The printing passes and heating events are set forth in Tables 1 and 2 below. N indicates that no agent is printed or that a particular lamp is not used and Y indicates that the agent is printed or that a particular lamp is used.

TABLE 1

| | Printing Passes | | | | | | |
|---|---|---|---|---|---|---|---|
| | Channel number | | | | | | |
| | 1 | 2 | 3 | 4 | 5 | 6 | 7 |
| Agent | AA | EA | EA | FA | DA | EA | DA |
| Contone level [a] | 255 | 120 | 120 | 8 | 8 | 120 | 120 |
| Printing pass 1 | N | N | N | Y | Y | N | N |
| Printing pass 2 | Y | Y | Y | N | N | Y | Y |
| Printing pass 3 | Y | Y | Y | Y | Y | Y | Y |
| Printing pass 4 | Y | Y | Y | N | N | Y | Y |

[a] Contone level is a parameter to control the ink/fluid density at the image area

TABLE 2

| Heating events | | |
|---|---|---|
| | Leading Lamp | Trailing Lamp |
| Heating Events with Printing pass 1 | Y | Y |
| Heating Events with Printing pass 2 | Y | Y |
| Heating Events with Printing pass 3 | Y | Y |
| Heating Events with Printing pass 4 | Y | N |

This example results in an over-fused part. The part is mechanically strong and has an aesthetically pleasing surface finish due to the strong heating conditions, but also has insufficient conductivity in the conductive regions. The conductivity is reduced due to a reduced loading of the electronic agent (e.g., compared to the maximum loading at 255 contone) and to over-fusing, which may result from the fusing agent being applied in the first and third printing passes (which enables energy absorption during several of the heating events). A typical resistance of an over-fused part is greater than 850 Ohms.

Prophetic Comparative Example 2

A fused layer is prepared with several printing passes and heating events.

The materials include: polyamide 12 build material, a sodium chloride activating agent (AA), a silver nanoparticle electronic agent (EA), a carbon black fusing agent (FA), and water as a detailing agent (DA). The conductive regions are to be formed with the AA and the EA and the non-conductive regions are to be formed with the FA and DA.

The printing system includes 7 ink/fluid channels to dispense the agents, and leading and trailing lamps positioned on either end of the carriage that accommodates the channels. When printing from right to left, leading lamp is exposed to the build material platform prior to the trailing lamp. After the 1st and 3rd printing passes and associated heating event(s), a controlled cooling step is performed. This involves the printing system waiting until a temperature of the build material surface cools down to or below a threshold temperature of 138° C. before proceeding with the next printing pass/heating event sequence.

The printing passes and heating events are set forth in Tables 3 and 4 below. N indicates that no agent is printed or that a particular lamp is not used and Y indicates that the agent is printed or that a particular lamp is used.

TABLE 3

| | Printing Passes | | | | | | |
|---|---|---|---|---|---|---|---|
| | Channel number | | | | | | |
| | 1 | 2 | 3 | 4 | 5 | 6 | 7 |
| Agent | AA | EA | EA | FA | DA | EA | DA |
| Contone level [a] | 255 | 255 | 255 | 3 | 3 | 255 | 255 |
| Preheating event | N | N | N | N | N | N | N |
| Printing pass 1 | Y | Y | Y | N | N | Y | Y |
| Printing pass 2 | Y | Y | Y | N | N | Y | Y |
| Printing pass 3 | Y | Y | Y | Y | Y | Y | Y |

[a] Contone level is a parameter to control the ink/fluid density at the image area

TABLE 4

| Heating events | | |
|---|---|---|
| | Leading Lamp | Trailing Lamp |
| Preheating Event | Y | Y |
| Heating Events with Printing pass 1 | Y | N |
| Heating Events with Printing pass 2 | Y | N |
| Heating Events with Printing pass 3 | Y | N |

This example results in an under-fused part. The part is not mechanically strong and does not have an aesthetically pleasing surface finish due to the weak heating conditions. The reduction in mechanical strength may also be due to the low loading of the fusing agent. This part may or may not have adequate conductivity in the conductive regions. For example, if the temperature is insufficient to fuse the portions with the activating agent and electronic agent, the conductivity may be deleteriously affected.

Example 3

A fused load cell was prepared with several printing passes and heating events.

The materials included: polyamide 12 build material, a sodium chloride activating agent (AA), a silver nanoparticle electronic agent (EA), a carbon black fusing agent (FA), and water tinted with black dye as a detailing agent (DA).

Figure 5A:
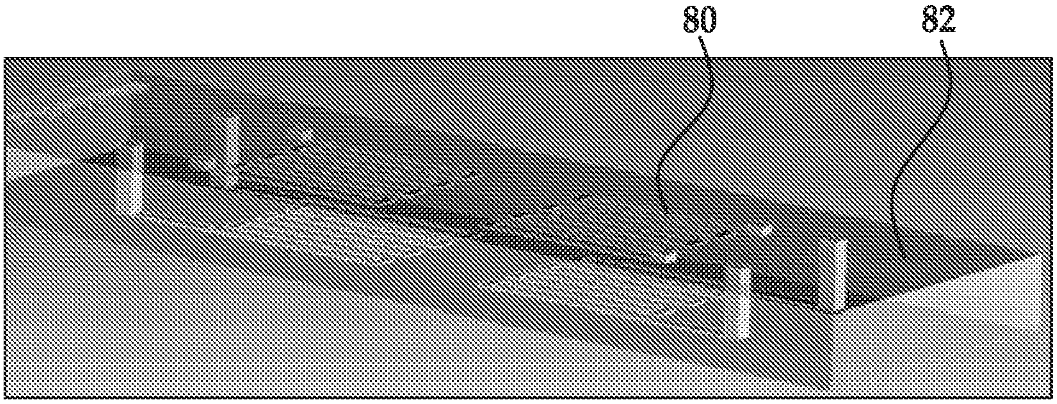
FIGS. 5A, 5B and 5C respectively depict A) an image from a stereolithography (.stl) file illustrating a design for a load cell, B) a photograph of the load cell formed via an example of the method disclosed herein in accordance with the design in FIGS. 5A, and C) an x-ray image of the example load cell of FIG. 5B.

The load cell was based on the design shown in FIG. 5A. The conductive regions to be formed with the AA and the EA are shown at reference numeral 80 and the pad region to be formed with the FA and DA is shown at reference numeral 82.

The printing system included a carriage with 7 ink/fluid channels to dispense the agents. Leading and trailing lamps were positioned on either end of the carriage, and these lamps were used for the heating events as shown in Table 6. The carriage speed during preheating was 20 inches per second (ips). The carriage speed during printing was 20 ips for each of the passes (see Table 5) per printed layer. A 50 millisecond wait time was utilized after each carriage pass/heating event was performed to allow for passive cooling. The temperature set point for the supply-side of the printer (i.e., the carriage) was 90° C.

Fourteen (14) layers of the polyamide 12 build material were spread and heated before printing was initiated. The build material platform was maintained at 150° C., but a temperature drop was observed after the first 10 layers were preheated. The build material platform temperature was 132° C. for the $11^{th}$ layer, 131° C. for the $12^{th}$ layer, 130° C. for the $13^{th}$ layer, and 129° C. for the $14^{th}$ layer. A $15^{th}$ layer was applied and preheated with the build material platform temperature at 129° C. This temperature then remained constant throughout printing. Layer 15 was the first layer upon which printing took place. A total of 52 layers were printed (including layer 15).

The printing passes and heating events are set forth in Tables 5 and 6 below. N indicates that no agent was printed or that a particular lamp was not used and Y indicates that the agent was printed or that a particular lamp was used.

TABLE 5

| Printing Passes | | | | | | | |
|---|---|---|---|---|---|---|---|
| | Channel number | | | | | | |
| | 1 | 2 | 3 | 4 | 5 | 6 | 7 |
| Agent | AA | EA | EA | FA | DA | EA | DA |
| Contone level [a] | 255 | 255 | 255 | 8 or 6 or 4 | 8 or 6 or 4 | 255 | 64 or 96 |
| Preheating events | N | N | N | N | N | N | N |
| Printing pass 1 | Y | Y | Y | N | N | Y | Y |
| Printing pass 2 | Y | Y | Y | N | N | Y | Y |
| Printing pass 3 | Y | Y | Y | Y | Y | Y | Y |

[a] Contone level is a parameter to control the ink/fluid density at the image area

TABLE 6

| Heating events | | |
|---|---|---|
| | Leading Lamp | Trailing Lamp |
| Preheating Events | Y | Y |
| Heating Events with Printing pass 1 | Y | N |
| Heating Events with Printing pass 2 | Y | Y |
| Heating Events with Printing pass 3 | Y | N |

Figure 5B:
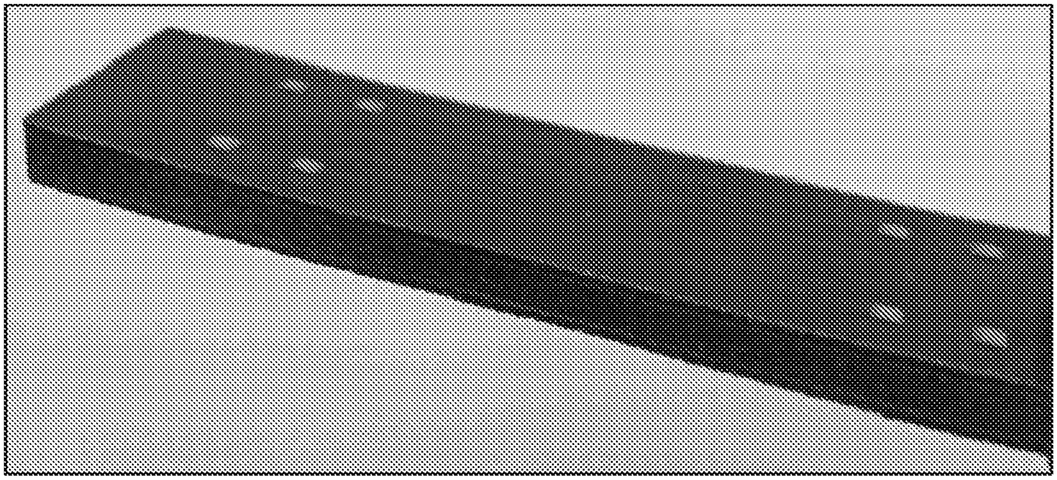

This example resulted in the fused load cell shown in FIG. 5B. The part was mechanically strong, and had a modulus of 1050 MPa. As depicted, the part also had an aesthetically pleasing surface finish.

Figure 5C:
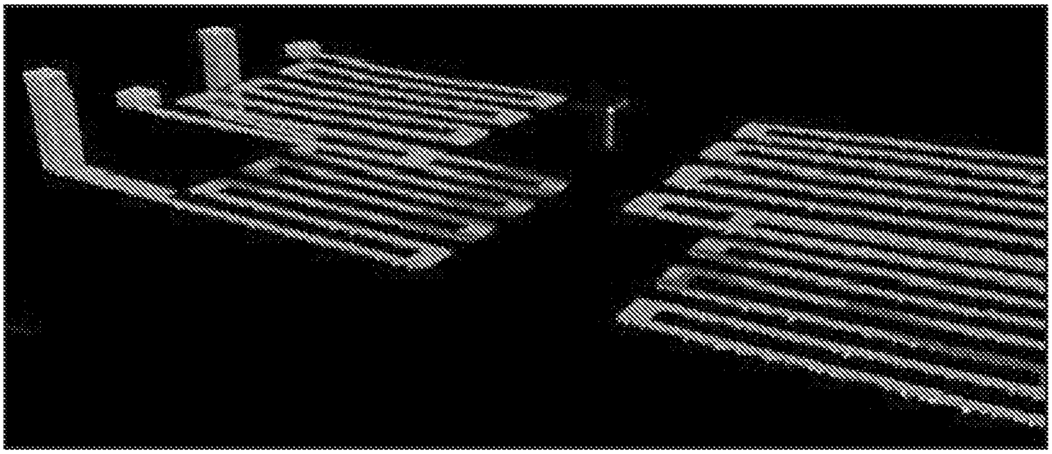

The fused load cell also had conductive regions, which can be seen in the X-ray of the fused load cell in FIG. 5C. The X-ray clearly illustrates the internal wiring that was formed. The resistance of each of the four conductive regions was below 200 ohms (e.g., ranging from 128 ohms to 193 ohms). The desirable conductivity was achieved, in part, by using the maximum loading of the AA and the EA, by printing these agents several times, and by spacing the heating events throughout the printing passes so that over-fusing did not occur.

The fused load cell was not over-fused due, at least in part, to the FA being printed only in the last pass, the DA being printed to prevent over-heating, and the use of passive cooling between printing/heating sequences.

It is to be understood that while prophetic examples 1 and 2 and example 3 illustrate the use of four carriage passes (including heating event(s) and/or printing passes), more carriage passes with heating event(s) and/or printing passes may be utilized to create parts with suitable electronic and mechanical properties.

Reference throughout the specification to “one example”, “another example”, “an example”, and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50 μm to about 300 μm should be interpreted to include the explicitly recited limits of about 50 μm to about 300 μm, as well as individual values, such as 55 μm, 125 μm, 130.5 μm, etc., and sub-ranges, such as from about 65 μm to about 225 μm, etc. Furthermore, when “about” is utilized to describe a value, this is meant to encompass minor variations (up to +/−10%) from the stated value.

In describing and claiming the examples disclosed herein, the singular forms “a”, “an”, and “the” include plural referents unless the context clearly dictates otherwise.

While several examples have been described in detail, it is to be understood that the disclosed examples may be modified. Therefore, the foregoing description is to be considered non-limiting.

What is claimed is:

1. A method for forming an electronic part, comprising:
- applying a build material to form a build material layer corresponding to a layer of the electronic part;
- performing a plurality of printing passes over a portion of the build material, comprising:
  - selectively applying an electronic agent on the portion of the build material in more than one of the printing passes; and
  - selectively applying a fusing agent on the portion of the build material in at least one of the printing passes;
- exposing the build material to radiation in a plurality of heating events interleaved with the printing passes,
  - wherein the portion of the build material is selectively fused together by the fusing agent during a final heating event of the heating events; and
- controlling selective application of the electronic agent in the more than one of the printing passes, the at least one of the printing passes in which the selective application of the fusing agent occurs, and interleaving of the heating events in relation to the printing passes to control a mechanical property and an electronic property of the layer of the electronic part.

2. The method of claim 1, wherein performing the printing passes further comprises:
- selectively applying a detailing agent on the portion of the build material in a same or different at least one of the printing passes in which the fusing agent is selectively applied,
- wherein the detailing agent controls a temperature at which the portion of the build material selectively fuses together.

3. The method of claim 1, wherein performing the printing passes further comprises:
- selectively applying a detailing agent on the portion of the build material in a same or different at least one of the printing passes in which the fusing agent is selectively applied,
- wherein the portion of the build material in contact with the detailing agent does not fuse.

4. The method of claim 1, wherein the heating events prior to the final heating event heat the build material without fusing the build material.

5. The method of claim 1, further comprising:
- cooling the build material to a threshold temperature after at least one of the heating events and prior to a subsequent one of the heating events.

6. The method of claim 5, wherein the build material is selected from a group comprising a polymeric build material, a ceramic build material, a metallic build material, or a composite build material, and wherein the threshold temperature ranges from about 10° C. to about 100° C. below a melting point of the build material.

7. The method of claim 1, wherein the fusing agent is selectively applied by thermal inkjet printing, piezoelectric inkjet printing, or continuous inkjet printing.

8. The method of claim 1, wherein at least one of the heating events occurs prior to the selective application of the fusing agent, and wherein at least one other of the heating events occurs subsequent to the selective application of the fusing agent.

9. The method of claim 1, further comprising:

selectively applying a detailing agent tinted with a colorant on the portion of the build material in a same or different at least one of the printing passes in which the fusing agent is selectively applied.

10. The method of claim 1, wherein the selective application of the fusing agent occurs in a final printing pass of the printing passes.

11. The method of claim 1, further comprising:

selectively applying an activating agent on the portion of the build material in a same or different more than one of the printing passes in which the electronic agent is selectively applied, wherein the activating agent includes a metal salt that activates the electronic agent.

12. The method of claim 11, wherein the metal salt includes a chloride salt, a bromide salt, or an iodide salt.

13. The method of claim 1, wherein the electronic agent includes a nanomaterial.

14. The method of claim 13, wherein at least one of the heating events prior to the final heating event sinters the nanomaterial to form a conductive matrix.

* * * * *